(12) United States Patent
Sieber

(10) Patent No.: US 10,461,587 B2
(45) Date of Patent: Oct. 29, 2019

(54) METHODS AND APPARATUS FOR POSITIONING A VEHICLE USING FOREIGN OBJECT DETECTION

(71) Applicant: WiTricity Corporation, Watertown, MA (US)

(72) Inventor: Lukas Sieber, Olten (CH)

(73) Assignee: WiTricity Corporation, Watertown, MA (US)

( * ) Notice: Subject to any disclaimer, the term of this patent is extended or adjusted under 35 U.S.C. 154(b) by 296 days.

(21) Appl. No.: 15/269,749

(22) Filed: Sep. 19, 2016

(65) Prior Publication Data

US 2018/0083349 A1    Mar. 22, 2018

(51) Int. Cl.
*H02J 50/90* (2016.01)
*B60L 53/12* (2019.01)
(Continued)

(52) U.S. Cl.
CPC .............. *H02J 50/90* (2016.02); *B60L 50/50* (2019.02); *B60L 53/12* (2019.02); *B60L 53/36* (2019.02);
(Continued)

(58) Field of Classification Search
CPC ........ H01Q 1/3291; H02J 50/90; H02J 50/10; H02J 50/60; H02J 5/005; H02J 7/025;
(Continued)

(56) References Cited

U.S. PATENT DOCUMENTS

| | | | | |
|---|---|---|---|---|
| 2012/0262002 A1* | 10/2012 | Widmer | .................. | H02J 5/005 307/104 |
| 2014/0084857 A1* | 3/2014 | Liu | ........................ | H02J 5/005 320/108 |

(Continued)

FOREIGN PATENT DOCUMENTS

| | | |
|---|---|---|
| DE | 102013227129 A1 | 6/2015 |
| EP | 2325037 A1 | 5/2011 |

(Continued)

OTHER PUBLICATIONS

Li W., et al., "Integrated ICC Compensation Topology for Wireless Charger in Electric and Plug-in Electric Vehicles", IEEE Transactions on Industrial Electronics, vol. 62, No. 7, Jul. 2015, pp. 4215-4225.

(Continued)

*Primary Examiner* — Carlos Amaya
(74) *Attorney, Agent, or Firm* — Knobbe, Martens Olson & Bear LLP

(57) ABSTRACT

In one aspect, an apparatus for determining alignment information of a vehicle is disclosed, the vehicle comprising an antenna circuit configured to modulate one or more electrical characteristics of the antenna circuit. The apparatus comprises multiple sensor circuits configured to generate multiple magnetic fields. At least one sensor circuit may be configured to sense the modulated electrical characteristic of the antenna circuit when the antenna circuit couples to the at least one sensor circuit via one of the magnetic fields. The apparatus may further comprise a controller circuit config- (Continued)

ured to determine alignment information of the vehicle based on the sensed modulated electrical characteristic.

30 Claims, 11 Drawing Sheets

(51) Int. Cl.
*H01Q 1/32* (2006.01)
*H04B 5/00* (2006.01)
*H02J 50/10* (2016.01)
*H02J 50/60* (2016.01)
*B60L 50/50* (2019.01)
*B60L 53/38* (2019.01)
*B60L 53/39* (2019.01)
*B60L 53/36* (2019.01)
*B60L 53/65* (2019.01)

(52) U.S. Cl.
CPC ............... *B60L 53/38* (2019.02); *B60L 53/39* (2019.02); *B60L 53/65* (2019.02); *H01Q 1/3291* (2013.01); *H02J 50/10* (2016.02); *H02J 50/60* (2016.02); *H04B 5/0037* (2013.01); *Y02T 10/7005* (2013.01); *Y02T 10/7072* (2013.01); *Y02T 90/121* (2013.01); *Y02T 90/122* (2013.01); *Y02T 90/125* (2013.01); *Y02T 90/128* (2013.01); *Y02T 90/14* (2013.01); *Y02T 90/163* (2013.01); *Y02T 90/169* (2013.01); *Y04S 30/14* (2013.01)

(58) Field of Classification Search
CPC ......... H02J 17/00; B60L 11/18; B60L 11/182; B60L 11/1829; B60L 11/1831; B60L 11/1833; B60L 11/1846; B60L 50/50; B60L 53/12; B60L 53/36; B60L 53/39; B60L 53/38; B60L 53/65; H04B 5/0037
See application file for complete search history.

(56) References Cited

U.S. PATENT DOCUMENTS

| | | | |
|---|---|---|---|
| 2014/0145514 A1* | 5/2014 | Konno | ................. B60L 11/182 307/104 |
| 2015/0137801 A1 | 5/2015 | Raedy et al. | |
| 2015/0278038 A1 | 10/2015 | Halker et al. | |
| 2015/0303714 A1 | 10/2015 | Keeling et al. | |
| 2016/0020642 A1 | 1/2016 | Liu et al. | |
| 2016/0031332 A1 | 2/2016 | Garcia et al. | |
| 2016/0075245 A1 | 3/2016 | Logvinov et al. | |

FOREIGN PATENT DOCUMENTS

| | | |
|---|---|---|
| WO | WO-2015075858 A1 | 5/2015 |
| WO | WO-2015129143 A1 | 9/2015 |

OTHER PUBLICATIONS

Zhang W., et al., "Loosely Coupled Transformer Structure and Interoperability Study for EV Wireless Charging Systems," IEEE Transactions on Power Electronics, Nov. 2015, vol. 30, No. 11, pp. 6356-6367.
International Search Report and Written Opinion—PCT/US2017/045758—ISA/EPO—Dec. 20, 2017.

* cited by examiner

METHODS AND APPARATUS FOR POSITIONING A VEHICLE USING FOREIGN OBJECT DETECTION

FIELD

This disclosure generally relates to wireless power. More specifically, the disclosure is directed to devices, systems, and methods related to aligning an electric vehicle with a wireless power transfer systems.

BACKGROUND

Wireless power transfer systems may differ in many aspects including circuit topologies, magnetics layout, and power transmission capabilities or requirements. The amount of power transferred and the efficiency of the power transfer between components of a wireless power transfer system may depend on the alignment between a transmitter pad of the wireless power transfer system and the receiver pad of an electric vehicle. Wireless power transfer systems generally include dedicated ancillary positioning and alignment systems. However, these ancillary systems add a significant amount to the overall cost and complexity of the wireless power transfer systems. Therefore, there is a need in the art to utilize existing components and systems to assist with aligning the receiver pad and the transmitter pad to improve the efficiency of the power transfer.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the present disclosure provides an apparatus for determining alignment information of a vehicle. The vehicle comprises an antenna circuit configured to modulate one or more electrical characteristics of the antenna circuit. The apparatus comprises a plurality of sensor circuits configured to generate a plurality of magnetic fields. At least one sensor circuit of the plurality of sensor circuits is configured to sense the modulated electrical characteristic of the antenna circuit when the antenna circuit couples to the at least one sensor circuit via one of the plurality of magnetic fields. The apparatus further comprises a controller circuit configured to determine alignment information of the vehicle based on the sensed modulated electrical characteristic.

Another aspect of the present disclosure provides a method for determining alignment information of a vehicle. The vehicle comprises an antenna circuit configured to modulate one or more electrical characteristics of the antenna circuit. The method comprises generating, by a plurality of sensor circuits, a plurality of magnetic fields. The method also comprises sensing, by at least one sensor circuit of the plurality of sensor circuits, the modulated electrical characteristic of the antenna circuit when the antenna circuit couples to the at least one sensor circuit via one of the plurality of magnetic fields. The method further comprises determining alignment information of the vehicle based on the sensed modulated electrical characteristic.

Another aspect of the present disclosure provides an apparatus for determining alignment information of a vehicle. The vehicle comprises an antenna circuit configured to modulate one or more electrical characteristics of the antenna circuit. The apparatus comprises means for generating a plurality of magnetic fields. The apparatus also comprises means for sensing the modulated electrical characteristic of the antenna circuit when the antenna circuit couples to the means for generating via one of the plurality of magnetic fields. The apparatus further comprises means for determining alignment information of the vehicle based on the sensed modulated electrical characteristic.

Another aspect of the present disclosure provides a non-transitory computer readable medium comprising instructions that, when executed by a processor, cause a wireless power transfer system to perform a method for determining alignment information of a vehicle. The vehicle comprises an antenna circuit configured to modulate one or more electrical characteristics of the antenna circuit. The method comprises generating, by a plurality of sensor circuits, a plurality of magnetic fields. The method also comprises sensing, by at least one sensor circuit of the plurality of sensor circuits, the modulated electrical characteristic of the antenna circuit when the antenna circuit couples to the at least one sensor circuit via one of the plurality of magnetic fields. The method further comprises determining alignment information of the vehicle based on the sensed modulated electrical characteristic.

DETAILED DESCRIPTION

The detailed description set forth below in connection with the appended drawings is intended as a description of certain implementations of the invention and is not intended to represent the only implementations in which the invention may be practiced. The term "exemplary" used throughout this description means "serving as an example, instance, or illustration," and should not necessarily be construed as preferred or advantageous over other exemplary implementations. The detailed description includes specific details for the purpose of providing a thorough understanding of the disclosed implementations. In some instances, some devices are shown in block diagram form.

Wireless power transfer may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field or an electromagnetic field) may be received, captured by, or coupled (such as being operationally coupled) by a "receive antenna" to achieve power transfer.

Figure 1:
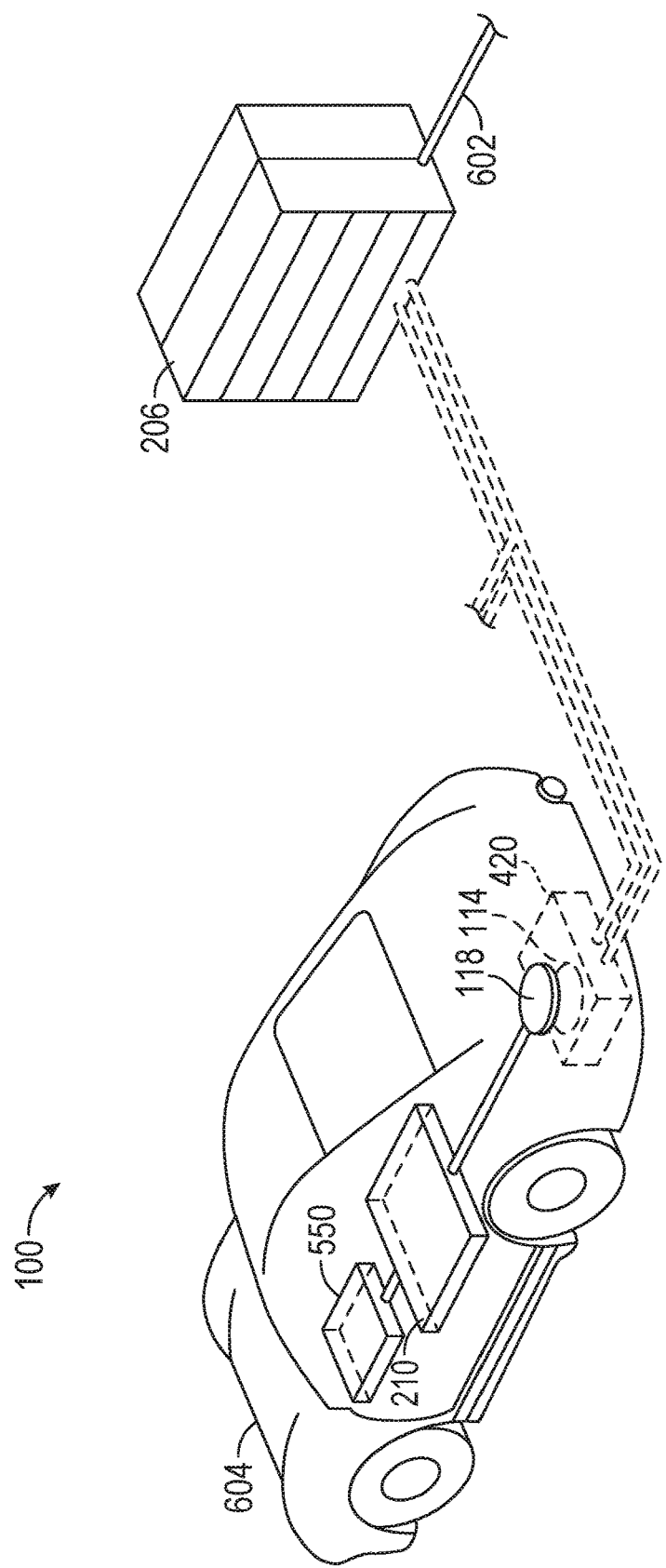
FIG. 1 is a diagram of an electric vehicle aligned over a transmitter pad in a wireless power transfer system, in accordance with an exemplary implementation.
Figure 2:
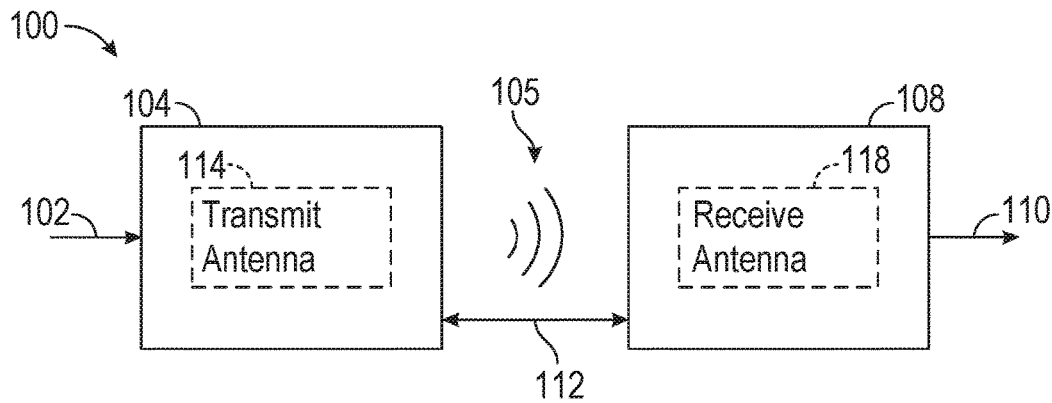
FIG. 2 is a functional block diagram of a wireless power transfer system, in accordance with one exemplary implementation.

FIG. 1 is a diagram of an electric vehicle 604 aligned over a transmitter pad 420 in a wireless power transfer system 100, in accordance with an exemplary implementation. The electric vehicle 604 (of FIG. 1) can be charged or powered in whole or in part using the wireless power transfer system 100 (of FIG. 2). As described below in connection to FIG. 5, a transmit circuitry 206 may be part of a transmitter 104 (FIG. 2). As shown in the embodiment of FIG. 1, the transmit circuitry 206 may be coupled to a power backbone 602 (e.g., a power grid). The transmit circuitry 206 is configured to receive power from the power backbone 602. As will be further described below in connection to FIG. 5, the transmitter pad 420 (which may also be referred to as a power transmitting circuit) may be coupled to the transmit circuitry 206 and be configured to receive power from the transmit circuitry 206. The transmitter pad 420 may comprise at least one transmit antenna 114 (e.g., a coil) coupled to the transmit circuitry 206. As shown in the embodiment of FIG. 1, the transmitter pad 420 may be located at or below the ground (as represented with dotted lines).

The electric vehicle 604 may be parked near the transmitter pad 420. The electric vehicle 604 may comprise a receive antenna 118 (e.g., a coil). As will be further described below in connection to FIG. 6, the receive antenna 118 may be part of a receiver pad 530 (which may also be referred to as a power receiving circuit), which may be part of a receiver 108. The receive antenna 118 may be positioned within a charging area of the transmit antenna 114 to receive power from the transmit antenna 114. As shown in the embodiment of FIG. 1, the electric vehicle 604 may comprise a receive circuitry 210 coupled to the output of the receive antenna 118. As will be further described below in connection to FIG. 6, the receive circuitry 210 is configured to receive power from the receive antenna 118. As shown in the embodiment of FIG. 1, the electric vehicle 604 may also comprise a load 550 (such as an electric vehicle battery 236 as described in connection to FIG. 3 or an electric vehicle engine) coupled to the output of the receive circuitry 210. The load 550 is configured to receive power from the receive circuitry 210. The receive circuitry 210 is configured to process the power received by the receive antenna 118 to power or charge the load 550.

FIG. 2 is a functional block diagram of a wireless power transfer system 100, in accordance with one exemplary implementation. An input power 102 may be provided to a transmitter 104 from a power source, such as a transmit circuit (not shown in this figure), to generate a wireless (e.g., magnetic or electromagnetic) field 105 for performing power transfer.

A receiver 108 is configured to couple to the wireless field 105 and generate an output power 110 for storing or consumption by a load (e.g., the load 550 of FIG. 1) coupled to the output power 110. The receiver 108 may receive power via the receive antenna 118 (e.g., a coil) when the receiver 108 is located in the wireless field 105 produced by the transmitter 104. The wireless field 105 corresponds to a region where energy output by the transmitter 104 may be captured by the receiver 108. The wireless field 105 may correspond to the "near field" of the transmitter 104 as will be further described below. The transmitter 104 may comprise a transmit antenna 114 (e.g., a coil) for transmitting energy to the receiver 108. The receiver 108 may comprise a receive antenna 118 for receiving or capturing energy transmitted from the transmitter 104. The near-field may correspond to a region in which there are strong reactive fields resulting from the currents and charges in the transmit antenna 114 that minimally radiate power away from the transmit antenna 114. The near-field may correspond to a region that is within about one wavelength (or a fraction thereof) of the transmit antenna 114. Both the transmitter 104 and the receiver 108 are separated by a distance 112.

In one exemplary implementation, the transmitter 104 and the receiver 108 are configured according to a mutual resonant relationship. When the resonant frequency of the receiver 108 and the resonant frequency of the transmitter 104 are substantially the same or very close, transmission losses between the transmitter 104 and the receiver 108 are minimal. As such, wireless power transfer may be provided over a larger distance in contrast to purely inductive solutions that may require large antennas which are very close (e.g., sometimes within millimeters). Resonant inductive coupling techniques may thus allow for improved efficiency and power transfer over various distances and with a variety of inductive antenna configurations.

As described above, efficient energy transfer may occur by coupling a large portion of the energy in the wireless field 105 to the receive antenna 118 rather than propagating most of the energy in an electromagnetic wave to the far field. When positioned within the wireless field 105, a "coupling mode" may be developed between the transmit antenna 114 and the receive antenna 118. The area around the transmit antenna 114 and the receive antenna 118 where this coupling may occur is referred to herein as a coupling mode region.

Figure 3:
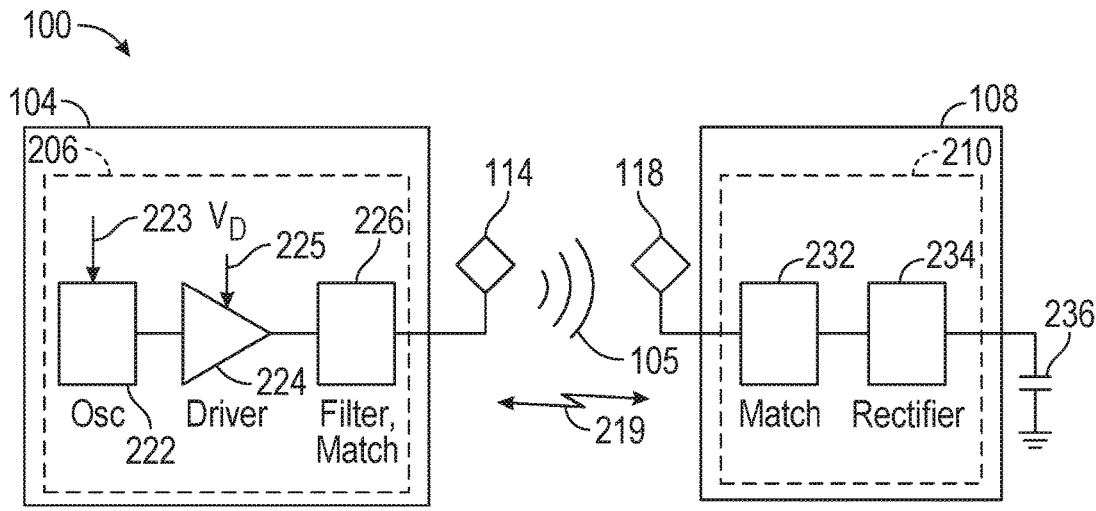
FIG. 3 is a functional block diagram of the wireless power transfer system of FIG. 2 with a transmit circuitry and a receive circuitry, in accordance with another exemplary implementation.

FIG. 3 is a functional block diagram of the wireless power transfer system 100 of FIG. 2 with a transmit circuitry 206 and a receive circuitry 210, in accordance with another exemplary implementation. As described in connection to FIG. 2, the system 100 comprises the transmitter 104 and the receiver 108. As illustrated in the embodiment of FIG. 3, the transmitter 104 may comprise the transmit circuitry 206. The transmit circuitry 206 may comprise an oscillator 222. The oscillator 222 is configured to generate an oscillated signal at a desired frequency that may be adjusted in response to a frequency control signal 223.

The transmit circuitry 206 may comprise a driver circuit 224 coupled to the output of the oscillator 222. The driver circuit 224 is configured to receive the oscillated signal from the oscillator 222 and output a driven signal. The driver circuit 224 may be configured to drive the transmit antenna 114 at, for example, a resonant frequency of the transmit antenna 214 based on an input voltage signal (VD) 225. The driver circuit 224 may be a switching amplifier configured to receive a square wave from the oscillator 222 and output a sine wave. For example, the driver circuit 224 may be a class E amplifier.

The transmit circuitry 206 may comprise a filter and matching circuit 226 coupled to the output of the driver circuit 224. The filter and matching circuit 226 is configured to receive the driven signal from the driver circuit 224. The filter and matching circuit 226 is configured to filter out harmonics or other unwanted frequencies from the driving signal to match the impedance of the transmitter 104 to the transmit antenna 114 and generate a filtered signal.

As described in connection to FIG. 2, the transmitter 104 may comprise the transmit antenna 114. As illustrated in the embodiment of FIG. 3, the transmit antenna 114 may be coupled to the output of the filter and matching circuit 226 and be configured to receive the filtered signal from the filter and matching circuit 226. The transmit antenna 114 is configured to generate the wireless field 105 to wirelessly output power at a level sufficient for charging a load.

As described in connection to FIG. 2, the receiver 108 may comprise the receive antenna 118. As illustrated in the embodiment of FIG. 3, the receive antenna 118 is configured to receive the wireless field 105 generated by transmit antenna 114. The transmit antenna 118 is configured to convert the power from the wireless field 105 into power that may be processed by the receive circuitry 210.

The receiver 108 may comprise the receive circuitry 210. The receive circuitry is coupled to the output of the receive antenna 118. The receive circuitry 210 may comprise a matching circuit 232 coupled to the output of the receive antenna 118. The matching circuit 232 may receive power output from the receive antenna 118 and match the impedance of the receive circuitry 210 to the receive antenna 118.

The receive circuitry 210 may comprise a rectifier circuit 234. The rectifier circuit 234 is coupled to the output of the matching circuit 232. The rectifier circuit 234 is configured to receive the output of the matching circuit 232. The rectifier circuit 234 is configured to generate a direct current (DC) power signal output from an alternate current (AC) power input.

The wireless transfer system 100 may comprise an electric vehicle battery 236. The electric vehicle battery 236 may be coupled to the output of the rectifier circuit 234 and is configured to receive the direct current (DC) power signal output from the rectifier circuit 234. The receiver 108 and the transmitter 10 may additionally communicate on a separate communication channel 219 (e.g., Bluetooth, Zig-Bee, cellular, etc.). The receiver 108 and the transmitter 10 may alternatively communicate via in-band signaling using characteristics of the wireless field 105.

Figure 4:
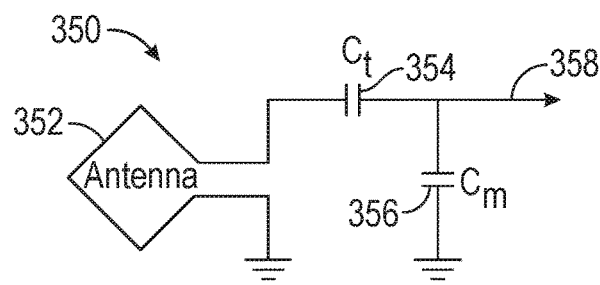
FIG. 4 is a schematic diagram of a portion of the transmit circuitry or the receive circuitry of FIG. 3 including the transmit antenna or the receive antenna, in accordance with an exemplary implementation.

FIG. 4 is a schematic diagram of a circuitry portion 350 of the transmit circuitry 206 or the receive circuitry 210 of FIG. 3 including the transmit antenna 114 or the receive antenna 118, in accordance with an exemplary implementation. As illustrated in the embodiment of FIG. 4, the transmit antenna 114 or the receive antenna 118 may comprise an antenna 352. The antenna 352 may also be referred to or be configured as a "loop" antenna 352. The antenna 352 may also be referred to herein or be configured as a "magnetic" antenna or an "induction" antenna. The term "antenna" generally refers to a component that may wirelessly output or receive energy for coupling to another "antenna." The antenna may also be referred to as a type of antenna that is configured to wirelessly output or receive power. In some embodiments, the antenna may be configured as a coil with one or more windings. As used herein, the antenna 352 is an example of a "power transfer component" of a type that is configured to wirelessly output and/or receive power.

The antenna 352 may comprise an air core or a physical core such as a ferrite core (not shown in this figure). The antenna 352 with an air core may be more tolerable to extraneous physical devices placed in the vicinity of the core. Furthermore, the antenna 352 with an air core may allow the placement of other components within the core area. In addition, the antenna 352 with an air core may more readily enable placement of the receive antenna 118 within a plane of the transmit antenna 114 where the coupled mode region of the transmit antenna 114 may be more powerful.

As stated, efficient transfer of energy between the transmitter 104 and the receiver 108 may occur during matched or nearly matched resonance between the transmitter 104 and the receiver 108. However, even when resonance between the transmitter 104 and the receiver 108 are not matched, energy may be transferred, although the efficiency may be affected. For example, the efficiency may be less when resonance is not matched. Transfer of energy occurs by coupling energy from the wireless field 105 to the receive antenna 118 rather than propagating the energy from the transmit antenna 114 into free space.

The resonant frequency of the antenna may be based on inductance and capacitance. Inductance may be simply the inductance created by the antenna 352, whereas, capacitance may be added to the antenna's inductance to create a resonant structure at a desired resonant frequency. As a non-limiting example, a capacitor 354 and a capacitor 356 may be added to the transmitter 104 or the receiver 108 to create a resonant circuit that selects a signal 358 at a resonant frequency. Accordingly, for larger diameter antennas, the size of capacitance needed to sustain resonance may decrease as the diameter or inductance of the loop increases.

Referring to FIGS. 2 and 3, the transmitter 104 may output a time varying magnetic (or electromagnetic) field with a frequency corresponding to the resonant frequency of the transmit antenna 114. When the receiver 108 is within the wireless field 105, the time varying magnetic (or electromagnetic) field may induce a current in the receive antenna 118. As described above, if the receive antenna 118 is configured to resonate at the frequency of the transmit antenna 114, energy may be efficiently transferred. The AC signal induced in the receive antenna 118 may be rectified as described above to produce a DC signal that may be provided to charge or to power a load.

Figure 5:
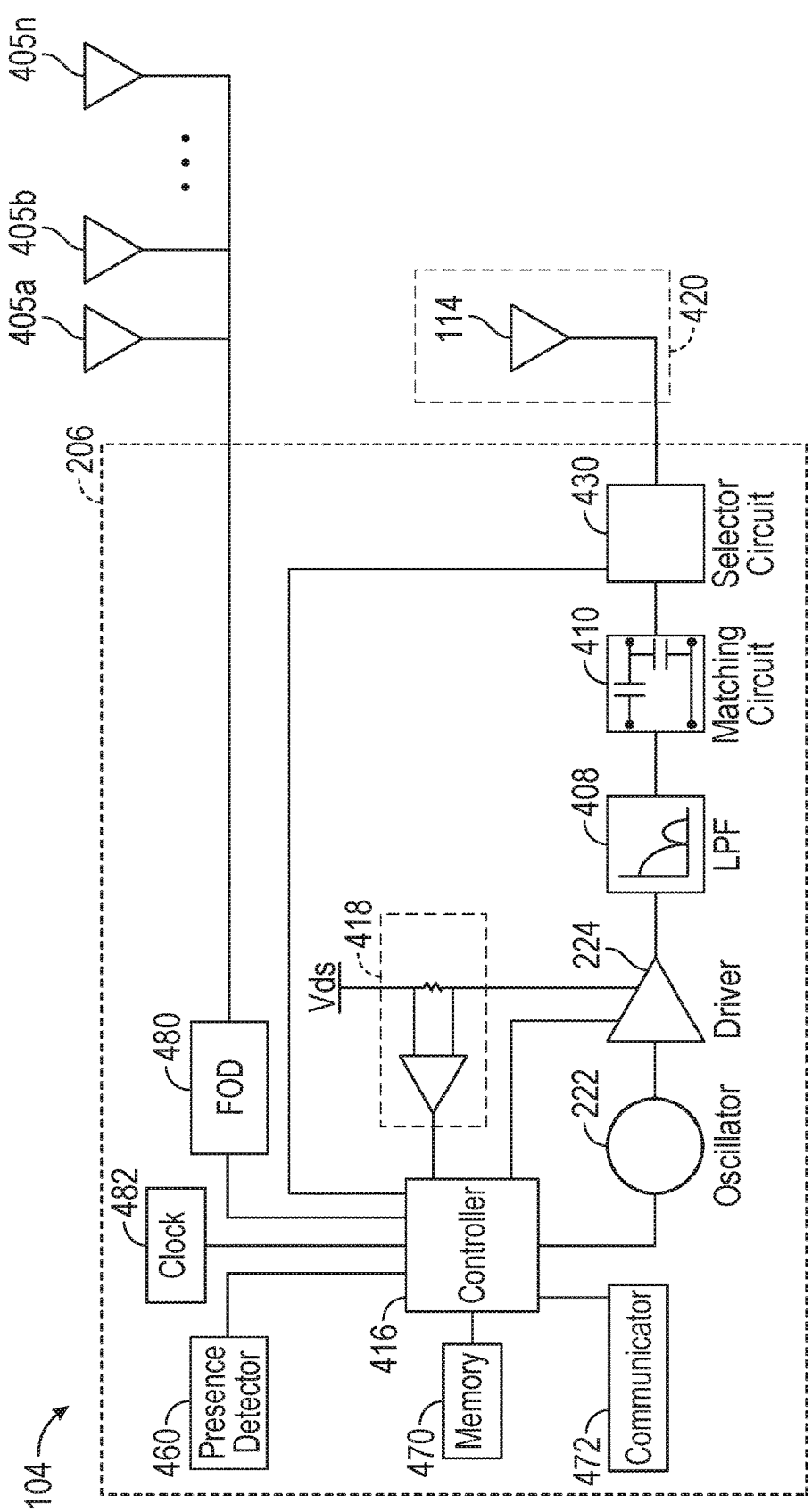
FIG. 5 is a functional block diagram of the transmitter that may be used in the wireless power transfer system of FIG. 2, in accordance with another exemplary implementation.

FIG. 5 is a functional block diagram of the transmitter 104 that may be used in the wireless power transfer system 100 of FIG. 2, in accordance with another exemplary implementation. As described in connection to FIG. 3, the transmitter 104 may comprise the transmit circuitry 206. The transmit circuitry 206 may comprise the oscillator 222. The transmit circuitry 206 may comprise the driver circuit 224.

As shown in the embodiment of FIG. 5, the transmit circuitry 206 may comprise a low pass filter (LPF) 408 coupled to the output of the driver circuit 224. The low pass filter 408 is configured to receive the driven signal from the driver circuit 224. The low pass filter 408 is configured to reduce harmonic emissions of the driver circuit 224 to levels that prevent self-jamming of the receiver 108 (of FIG. 3) to output a low pass filtered signal.

The transmit circuitry 206 may comprise a matching circuit 410 coupled to output of the low pass filter 408. The matching circuit 410 is configured to receive the low pass filtered signal from the low pass filter 408. The matching circuit 410 is configured to match the impedance of the transmit circuitry 206 to least one transmit antenna 114.

The transmit circuitry 206 may comprise a selector circuit 430 coupled to the output of the matching circuit 410. The selector circuit 430 is configured as a switch to receive the output of the matching circuit 410. The selector circuit 430 is configured to selectively activate or disable the transmit antenna 114 by receiving instruction signals from a controller circuit 416 as will be described in greater detail below. By activating the transmit antenna 114, the selector circuit 430 is configured to connect the transmit circuitry 206 to the activated transmit antenna 114 and allow the output of the matching circuit 410 to pass to the activated transmit antenna 114. By disabling the transmit antenna 114, the selector circuit 430 is configured to not allow (e.g., block) the output of the matching circuit to pass to the disabled transmit antenna 114 by disconnecting the disabled transmit antenna 114 from the transmit circuitry 206. Accordingly, power from the driven signal can be selectively transmitted or not transmitted by the transmit antenna 114.

The transmitter 104 may comprise a transmitter pad 420 (also referred to as a "base transmitter pad"). The transmitter pad 420 may comprise at least one transmit antenna 114. The transmit antenna 114 may be coupled to the output of the selector circuit 430. The transmitter pad 420 is configured to receive the output of the selector circuit 430 and pass the output of the selector circuit 430 to the transmit antenna 114. The transmitter pad 420 is configured to generate an electromagnetic or magnetic field in a region, hereinafter referred to as a "charging region." Also, the transmit antenna 114 of the transmitter pad 420 is configured to generate an electromagnetic or magnetic field in an area of the charging region, hereinafter referred to as a "charging area." The transmit antenna 114 is configured to transmit power to the receiver 108 within the charging area of the transmit antenna 114. In an exemplary embodiment, the transmit antenna 114 may receive an acknowledgement from the receiver 108 regarding the amount of power the receiver 108 has received. The transmit antenna 114 may also receive information from the receiver 108 about the various specifications of the receiver 108, as described below. Although only one transmit antenna 114 is specifically illustrated, as will be described further below, the transmitter 104 may comprise any number (one or greater) of transmit antennas in accordance with different embodiments.

The transmit circuitry 206 may comprise the controller circuit 416 coupled to the selector circuit 430, the oscillator 222, and the driver circuit 224. The controller circuit 416 is configured to control various components of the transmit circuitry 206, including the selector circuit 430, the oscillator 222 and the driver circuit 224.

The transmit circuitry 206 may comprise a memory 470. The memory may be coupled to the controller circuit 416. The memory 470 is configured to communicate with the controller circuit 416. The controller circuit 416 is configured to control the memory 470. The memory 470 is configured to temporarily or permanently store data for use in the determinations of the controller circuit 416. The memory 470 may also store various specifications of the components of the transmitter 104 and/or the receiver 108 for use in determinations as described below.

The transmit circuitry 206 may comprise a presence detector circuit 460. The presence detector circuit 460 may be coupled to the controller circuit 416. The presence detector circuit 460 is configured to communicate with the controller circuit 416. The controller circuit 416 is configured to control the presence detector circuit 460. The presence detector circuit 460 is configured to detect the presence of the receive antenna 118 within the charging area of at least one transmit antenna 114. In certain embodiments, the presence detector circuit 460 may be a motion sensor configured to detect the receive antenna 118. The motion sensor may be (but is not limited to) an ultrasonic sensor, microwave sensor or tomographic motion sensor. In some embodiments, the presence detector circuit 460 may be configured to detect the presence of a living being, such as a human, and selectively trigger adjustment of the power based on the presence of the living being.

The transmit circuitry 206 may comprise a load sensing circuit 418 coupled to the controller circuit 416 and the driver circuit 224. The load sensing circuit 418 is configured to communicate with the controller circuit 416. The controller circuit 416 is configured to control the load sensing circuit 418. The load sensing circuit 418 is configured to monitor the current flowing to the driver circuit 224.

The transmit circuitry 206 may comprise a clock 482. The clock 482 is coupled to the controller circuit 416 and configured to communicate with the controller circuit 416. The controller circuit 416 is configured to control the clock 482. The clock 482 is configured to generate a clock signal which enables the controller circuit 416 to synchronize actions performed by the transmit circuitry 206. In one embodiment, the controller circuit 416 may use the clock signal to maintain clock synchronization between the transmitter 104 and the receiver 108.

The transmit circuitry 206 comprises a foreign object detector circuit 480. The foreign object detector circuit 480 is coupled to the controller circuit 416. The foreign object detector circuit 480 is configured to communicate with the controller circuit 416. The controller circuit 416 is configured to control the foreign object detector circuit 480. As illustrated in the embodiment of FIG. 5, the foreign object detector circuit 480 may be coupled to one or more sensor circuits 405. The sensor circuits 405 may also be referred to or be configured as a sense coil 405. In some embodiments, the foreign object detector circuit 480 is configured to communicate with one or more sense coils 405a, 405b, ... 405n, where "n" designates an arbitrary or predetermined number of sense coils 405a, 405b, ... 405n, collectively hereinafter "405." The sense coils 405 are configured to detect a foreign object. Each of the sense coils 405 may be configured to detect the foreign object in the charging area associated with the transmit antenna 114. The foreign object may include the electric vehicle 604, any part or component of the electric vehicle 604, or any metal objects, coins, jewelry, eye-glasses, key-chains, and the like.

The foreign object detector circuit 480 may be configured to detect one or more objects as described herein. For example, in accordance with an embodiment, the foreign object detector circuit 480 may include one or more sense coils 405 configured to generate a magnetic field in an area above the sense coils 405, hereinafter referred to as a "sense area." Therefore, the one or more sense coils 405 and/or the foreign object detector circuit 480 may be an example of one means for generating a plurality of magnetic fields. Each sense coil 405 is configured to detect or sense a disturbance in its field caused by the presence of an object (not shown in FIG. 5) within the sense area, such as a metal object (e.g., an antenna circuit 620 of FIG. 6). For example, when an object is positioned within the sense area of a given sense coil 405, the object causes a disturbance in the field generated by the sense coil 405 and a magnetic coupling is developed between the object and the sense coil 405. The magnetic coupling causes the disturbance in the field to generate a response detected by the sense coil 405, for example, a change in the complex impedance of the sense coil 405. Therefore, the sense coils 405 may be an example of one means for sensing the modulated electrical characteristic. The foreign object detector circuit 480 is configured to sense this change in impedance, for example, as a change in the current flow or voltage level for generating the magnetic field within the sense area. Therefore, the foreign object detector circuit 480 may be an example of a means for sensing the modulated electrical characteristic, for example, as at least one sensing circuit configured to sense the modulated electrical characteristic based on a disturbance in the magnetic field generated by the sense coils 405. The sense coils 405 may be provided over the surface of the transmitter pad 420, in some embodiments, to detect objects anywhere within the charging region of each of the transmitter pad 420. Therefore, the one or more sense coils 405 and/or the foreign object detector circuit 480 may be an example of one means for sensing a modulated electrical characteristic. In some embodiments, multiple sense coils 405 may be provided so as to increase the sensitivity of the foreign object detector circuit 480. As another example, the foreign object detector circuit 480 may include sensors such as the type of sensors described above with reference to the presence detector circuit 460 to detect a presence of a foreign object.

As described above, the foreign object detector circuit 480 is configured to communicate with the controller circuit 416. The controller circuit 416 is configured to control the foreign object detector circuit 480 by sending control signals to the foreign object detector circuit 480. For example, the foreign object detector circuit 480 may be configured to scan the sense coils 405 at a predetermined repetition rate, hereinafter a "scan rate." The controller circuit's 416 control signals may be indicative of the scan rate. The foreign object detector circuit 480 is configured to drive each sense coil 405 based on the scan rate, thereby scanning through the sense coils 405. In some implementations, the scan rate is 6.25 Hz, however, other scan frequencies are possible (e.g., 25 Hz or greater). The controller circuit's 416 control signals may also be indicative of an amount of current to be applied to each sense coil 405 for generating the magnetic field, sometimes also referred to as a "probe current." In some implementations, the current may be within a range of approximately 30 $mA_{RMS}$ to approximately 100 $mA_{RMS}$. However, other current values are possible such that the foreign object detector circuit 480 is capable to deliver this current to the sense coils 405. In some implementations, the current may be supplied as an AC current having a frequency (hereinafter a "scan frequency"). The scan frequency may be approximately 3 MHz in some embodiments, but other frequencies are possible. Therefore, the foreign object detector circuit 480 and/or the controller circuit 416 may be an example of a driving circuit configured to drive the one or more sense coils 405 with a current to generate one or more magnetic fields. In some embodiments, the means for generating the magnetic fields may comprise some or all of the components of the means for sensing the modulated electrical characteristic (e.g., the sensing coils 405 may be part of the means for generating the magnetic field and means for sensing the modulated electrical characteristic).

In an exemplary implementation, the foreign object detector circuit 480 is configured to send information to the sense coils 405 such that the sense coils are always active. In this embodiment, the sense coils 405 are constantly supplied the current based on the scan rate such that the foreign object detector circuit can detect the presence of an object within any one of the sense areas of the sense coils 405. In another embodiment, based on the controller circuit's 416 control signals, the foreign object detector circuit 480 may be configured to send information to the sense coils 405 in order to selectively activate or deactivate the one or more sense coils 405 to generate the corresponding magnetic field. Based on the controller circuit's 416 control signals, the foreign object detector circuit 480 is configured to selectively activate one or more sense coils 405 when an object (e.g., a foreign object, the electric vehicle 604 of FIG. 1, the antenna circuit of FIG. 6, etc.) is within the sense area of one or more sense coils 405. For example, the presence detector circuit 460 detects an object (e.g., the electric vehicle 604) within the charging area of the transmit antenna 114 and communicate the detection to the controller circuit 416. The controller circuit 416 may communicate the control signals to the foreign object detector circuit 480 to activate one or more of the sense coils 405. As another example, the electric vehicle 604 may send a signal, via controller circuit 516 of FIG. 6, indicative of the electric vehicle 604 approaching the transmit antenna 114. The controller circuit 516 may send control signals to the communicator circuit 566 indicative of the electric vehicle 604 approaching the transmit antenna 114. The communicator circuit 566 may be configured to send the confirmation request to the communicator circuit 472 of FIG. 5 via the communication link, as described above in connection to FIGS. 5 and 6. The communicator circuit 472 may pass the indication to the controller circuit 416. The controller circuit 416 may send control signals to the foreign object detector circuit 480 indicative of activating one or more sense coils 405. In response to the controller circuits' 416 control signals, the foreign object detector circuit 480 can supply the current to one or more of the sense coils 405. Thereby, by selectively activating and/or disabling the sense coils 405, the controller circuit 416 can utilize the foreign object detector circuit 480 to be activated for identifying an object within a sense area and be disabled when there are no objects present.

Based on detecting an object, the sense coils 405 are configured to communicate with the foreign object detector circuit 480. Each sense coil 405 is configured to transmit a detection signal indicative of detecting the foreign object within its sense area, as described above. The foreign object detector circuit 480 is configured to communicate with the controller circuit 416 by sending the detection signals to the controller circuit 416. Based on the detection signals, the controller circuit 416 may be configured to determine the position of the object relative to the one or more sense coils 405, as will be described in connection to FIG. 8. Based on the detection signals, the controller circuit 416 may also be configured to identify the object as a foreign object or part of the electric vehicle 604 (e.g., the antenna circuit 620), as will be described in connection to FIGS. 6 and 8.

As described above, the transmit circuitry 206 may comprise the selector circuit 430. The selector circuit 430 is configured to communicate with the controller circuit 416. The controller circuit 416 is configured to control the selector circuit 430 by sending control signals to the selector circuit 430. Based on the controller circuit's 416 control signals, the selector circuit 430 is configured to send information to the transmitter pad 420 in order to selectively activate or disable the transmit antenna 114. Based on the controller circuit's 416 control signals, the selector circuit 430 is configured to selectively activate or disable the transmit antenna 114 when the foreign object detector circuit 480 detects a foreign object within the charging area of the transmit antenna 114. As another example, based on the controller circuit's 416 control signals, the selector circuit 430 is configured to selectively activate or disable the transmit antenna 114 when the foreign object detector circuit 480 detects an object identified by the controller circuit 416 to be indicative of the receive antenna 118 (or receiver pad 530) within the charging area of the transmit antenna 114. Thereby, by selectively activating and/or disabling the transmit antenna 114, the transmitter can more efficiently utilize the transmit antenna 114 to be activated when useful and be disabled when not useful for wireless power transfer.

Based on the controller circuit's 416 control signals, the selector circuit 430 may also be configured to selectively activate or disable a particular transmit antenna 114 when the presence detector circuit 460 detects the receive antenna 118 within the charging area of the particular transmit antenna 114. For example, the selector circuit 430 may selectively activate the transmit antenna 114 when the presence detector circuit detects the receive antenna 118 within the charging area of the transmit antenna 114 and disable the transmit antenna 114 when the presence detector circuit does not detect the receive antenna 118 within the charging area of the transmit antenna 114.

The transmit circuitry 206 may comprise a communicator circuit 472. The communicator circuit 472 may be coupled to the controller circuit 416. The controller circuit 416 is configured to control the communicator circuit 472. The communicator circuit 472 is configured to pass information to and from the controller circuit 416. For example, the communicator circuit 472 is configured to enable the controller circuit 416 to communicate with the receiver 108 by establishing a communication link with the receiver 108 (FIG. 3). The communication link may be made with any communication protocol (e.g., an ultra-wideband radio communications protocol, Wi-Fi communication, Bluetooth communication protocol, and the like). Further discussion of the communication link is provided in connection to FIG. 6. As another example, the communicator circuit 472 is configured to enable the controller circuit 416 to communicate with a driver (or an autopilot in case of an automatically driven vehicle) of the electric vehicle 604 through the receiver 108 or other components of the electric vehicle 604.

Although FIG. 5 shows many different components in functional block forms, an actual physical embodiment may combine one or more functional blocks in a single, unitary component. For example, the clock 482 or the foreign object detector circuit 480 may be combined with the controller circuit 416. In another physical embodiment, the components may be included as discrete components. Also, in another physical embodiment, each sense coil 405 may have its own foreign object detector circuit 480, rather than multiple sense coils 405a, 405b, 405n sharing the foreign object detector circuit 480 as illustrated in FIG. 5.

Figure 6:
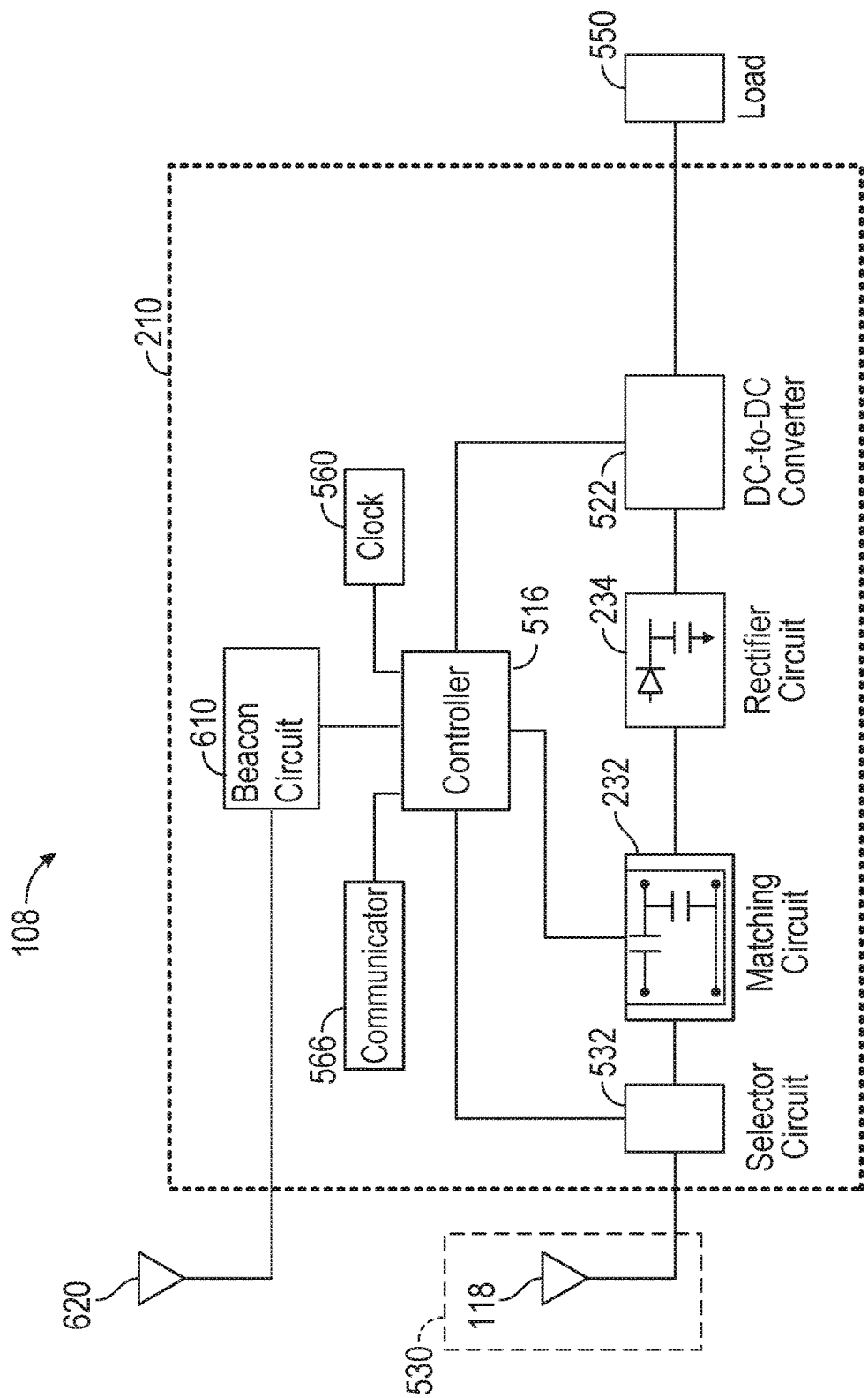
FIG. 6 is a functional block diagram of the receiver that may be used in the wireless power transfer system of FIG. 2, in accordance with another exemplary implementation.

FIG. 6 is a functional block diagram of the receiver 108 that may be used in the wireless power transfer system 100 of FIG. 2, in accordance with another exemplary implementation. As shown in the embodiment of FIG. 6, the receiver 108 may comprise a receiver pad 530 (also referred to as a "vehicle receiver pad"). The receiver pad 530 may comprise at least one receive antenna 118. The receive antenna 118 is configured to receive wireless power from the transmit antenna 114 (of FIG. 5). The receive antenna 118 is optionally configured to communicate with the transmit antenna 114. This communication may allow the receiver 108 to send information to the transmitter 104. Although only one receive antenna 118 is specifically illustrated, the receiver 108 may comprise any number (one or greater) of receive antennas in accordance with different embodiments.

As described in connection to FIG. 3, the receiver 108 may comprise the receive circuitry 210. As shown in the embodiment of FIG. 6, the receive circuitry 210 may comprise a beacon circuit 610 coupled to one or more antenna circuits 620. The antenna circuit 620 may also be referred to or be configured as a "beacon" antenna 620. The beacon circuit 610 is coupled to the controller circuit 516. The controller circuit 516 is configured to control the beacon circuit 610. The beacon circuit 610 is configured to control the beacon antenna 620, as will be described below. In an exemplary implementation, the beacon antenna 620 may be integrated into the receive antenna 118. However, as described below in connection to FIGS. 9A-9C, the beacon antenna 620 may also be attached to or integrated into other regions of the electric vehicle 604 or the components thereof.

The beacon antenna 620 may also be referred to or be configured as beacon "loop" antennas 620. The beacon antenna 620 may also be referred to herein or be configured as "magnetic" antennas or "induction" antennas. In some embodiments, the beacon antenna 620 may be configured as a coil with one or more windings. As used herein, the beacon antenna 620 are an example of one or more foreign objects detectable by the foreign object detector circuit 480 of FIG. 5. The beacon antenna 620 has one or more electrical characteristics (e.g., impedance) based on the electrical properties of its structure and components, as described in connection to FIGS. 10 and 11. Although only one beacon antenna 620 is specifically illustrated, as will be described further below in connection to FIGS. 9A-9C, the electric vehicle 604 may comprise any number (one or greater) beacon antennas, in accordance with different embodiments.

In an exemplary implementation, the controller circuit 516 is configured to control the beacon circuit 610 by sending control signals to the beacon circuit 610. The beacon circuit 610 is coupled to the beacon antenna 620 and is configured to change the electrical characteristic of the beacon antenna 620 based on the control signals. For example, the beacon circuit 610 is configured to modulate, vary, or modify one or more electrical characteristics of the beacon antenna 620 in response to controller circuit's 516 control signals. In an exemplary implementation, the beacon circuit 610 is configured to impart a distinctive modulation onto the electrical characteristic of the beacon antenna 620, as will be described in connection to FIGS. 10 and 11. The distinct modulation pattern may uniquely identify the beacon antenna 620 from another foreign object. For example, the distinct modulation pattern may be predetermined and/or static.

In an exemplary implementation, the controller circuit 516 is configured to selectively activate the beacon antenna 620 by sending control signals to the beacon circuit 610 indicative of activating the beacon antenna 620. The controller circuit 516 may be configured to receive an input from the driver (or an autopilot in case of an automatically drive vehicle) indicative of the electric vehicle 604 approaching the transmit antenna 114 (as described in connection to FIG. 7). For example, the driver may operate the electric vehicle indicative of parking into a parking space (e.g., one of parking spaces 707 of FIG. 7). In some embodiments, the controller circuit 516 may receive an input from controller circuit 416 of FIG. 5, via the communication link, indicative of approaching the transmit antenna 114. In response to receiving the input, the controller circuit 516 may send control signals to the beacon circuit 610, thereby modulating one or more electrical characteristics of the beacon antenna 620.

The modulation of the electrical characteristic can be sensed by the foreign object detector circuit 480 and used by the controller circuit 416, as described herein to identify the beacon antenna 620. For example, as described below in connection to FIG. 10 (sometimes referred to as a "passive beacon antenna"), the beacon circuit 610 may be configured to modulate the impedance of the beacon antenna 620. The modulation of the impedance may generate a distinctive change in the disturbance of a field generated by at least one of the sense coils 405 of FIG. 5. The distinctive change of the disturbance may also be referred to herein or be configured to "predictable," "predetermined," "identifiable," etc. In one implementation, the distinctive disturbance may be indicative of the presence of the beacon antenna 620 within the sense area of at least one sense coil 405. In some implementations, the distinctive disturbance may be configured to identify the beacon antenna 620 from a foreign object, identify the beacon antenna 620 as part of the electric vehicle 604, and/or identify the electric vehicle 604 as a particular vehicle, as described as described herein. As another example, described below in connection to FIG. 11 (sometimes referred to as an "active beacon antenna"), the beacon circuit 610 may be configured to drive at least one beacon antenna 620 with a predetermined current. The foreign object detector circuit 480 may then measure a voltage across each sense coil 405 to distinguish the beacon antenna 620 from a foreign object. In one embodiment, the electric vehicle 604 may include the beacon antenna described in connection to FIG. 10. In another embodiment, the electric vehicle 604 may include a beacon antenna described in connection to FIG. 11. In yet another embodiment, the electric vehicle 604 may include multiple beacon antennas that may be or may comprise one of each beacon antenna described in connection to FIGS. 10 and 11. As used herein, the beacon antenna 620 is an example of a foreign object detectable by the foreign object detector circuit 480 indicative of the electric vehicle 604.

As described above, the controller circuit 516 of FIG. 6 is configured to control the beacon circuit 610 to identify the electric vehicle 604 as a particular vehicle. For example, the controller circuit 516 may communicate control signals to the beacon circuit 610 indicative identification information. The identification information may comprise a vehicle identification (e.g., a number identifying the make and model of the electric vehicle 604), an owner identification (e.g., the legal owner of the electric vehicle), or other information capable of identifying a particular electric vehicle 604 from any other electric vehicles. The beacon circuit 610 can be configured to modulate or modify the electrical characteristic of the beacon antenna 620 based on the identification information. For example, the beacon circuit 610 can be configured to impart the distinctive modulation in a predetermined and identifiable pattern or scheme indicative of the identification information. The distinctive modulation in a predetermined and identifiable pattern or scheme may uniquely identify the electric vehicle 604. In some implementations, the controller circuit 416 of FIG. 5 can be configured to confirm the identification information with controller circuit 516 of FIG. 6. For example, upon receiving the identification information, the controller circuit 416 may be configured to send control signals to the communicator circuit 472 indicative of a request to confirm the identification information. The communicator circuit 472 may be configured to send the confirmation request to the communicator circuit 566 via the communication link, as described above in connection to FIGS. 5 and 6. The communicator circuit 566 may pass the request to the controller circuit 516 of the receiver 108 to verify that the identification information is correct. Upon verification, the controller circuit 516 may communicate an acknowledgement indication via the communication link back to controller circuit 416. Therefore, the controller circuit 416 and/or the controller circuit 516 may be an example of a means for uniquely identifying the beacon antenna 620 and/or electric vehicle 604.

As shown in the embodiment of FIG. 6, the receive circuitry 210 may comprise a selector circuit 532 coupled to the outputs of the receive antenna 118. The selector circuit 532 is configured to receive the power output by the receive antenna 118. As will be discussed below, the selector circuit 532 is configured to be controlled by a controller circuit 516. The selector circuit 532 is configured to selectively activate (by connecting) or disable (by disconnecting) the receive antenna 118 from the receive circuitry 210. Disabling the receive antenna 118 may suspend charging of a load 550 such that the load receives no power from the receive antenna 118. The selector circuit 532 is configured to selectively activate or disable the receive antenna 118 receiving power from the transmit antenna 114 when a foreign object is detected within the charging area of the transmit antenna 114. The transmitter 104 can communicate the presence of the foreign object to the receiver 108 using any communication protocol. Thereby, by selectively activating and/or disabling the receive antenna 118 using the selector circuit 532, the selector circuit 532 may pass the power output by the activated receive antenna 118 to the matching circuit 232 to power or charge the load 550 when the electric vehicle 604 is aligned with the wireless power transfer system 100.

The selector circuit 532 may also be configured to selectively activate or disable the receive antenna 118 when the presence detector circuit 460 detects the receive antenna 118 within the charging area of the transmit antenna 114. The presence detector circuit 460 may communicate the detection of the receive antenna 118 within the charging area of the transmit antenna 114 to the receiver 108 using any communication protocol.

As described in connection to FIG. 3, the receive circuitry 210 may comprise the matching circuit 232. As shown in connection to the embodiment of FIG. 6, the matching circuit 232 may be coupled to the output of the selector circuit 532. The matching circuit 232 is configured to receive the output of the activated receive antenna 118. As described in connection to FIG. 3, the receive circuitry 210 may comprise the rectifier circuit 234 coupled to the matching circuit 232.

As shown in connection to the embodiment of FIG. 6, the receive circuitry 210 may comprise a DC-to-DC converter 522 coupled to the output of the rectifier circuit 234. The DC-to-DC converter 522 is configured to receive the direct current (DC) power signal from the output of the rectifier circuit 234. The DC-to-DC converter 522 may convert the direct current (DC) power signal into an energy potential (e.g., a voltage) that is compatible with the charging or power requirements of the load 550. The load 550 may be coupled to the output of the DC-to-DC converter 522 and be configured to receive the energy potential output by the DC-to-DC converter 522.

The receive circuitry 210 may comprise the controller circuit 516 coupled to the DC-to-DC converter 522, the matching circuit 232 and the selector circuit 532. The controller circuit is configured to control various components of the receive circuitry 210, including the DC-to-DC converter 522, the matching circuit 232 and the selector circuit 532. As discussed above, the controller circuit 516 is configured to control the selector circuit 532. The controller circuit 516 is configured to control the selector circuit 532 by sending control signals to the selector circuit 532. Thereby, based on the controller circuit's 516 control signals, the selector circuit 532 is configured to selectively activate (by connecting) or disable (by disconnecting) the receive antenna 118 from the receive circuitry 210.

The receive circuitry 210 may comprise a clock 560. The clock 560 may be coupled to the controller circuit 516 and is configured to communicate with the controller circuit 516. The controller circuit 516 is configured to control the clock 560. The clock is configured to generate a clock signal which enables the controller circuit 516 to synchronize actions performed by the controller circuit 516. In one embodiment, the controller circuit 516 may use the clock signal to synchronize the actions of the transmitter 104 and the receiver 108.

The receive circuitry 210 may comprise a communicator circuit 566. The communicator circuit 566 may be coupled to the controller circuit 516. The controller circuit 516 is configured to control the communicator circuit 566. The communicator circuit 566 is configured to pass information to and from the controller circuit 516. The communicator circuit 566 is configured to enable communications between the controller circuit 516 and controller circuit 416 (of FIG. 5) by establishing a communication link with the communicator circuit 472 (of FIG. 5). The communication link may be implemented using any communication protocol. In certain embodiments, the communication link may be a two-way communication protocol (e.g., an ultra-wideband radio communications protocol, Wi-Fi communication, Bluetooth communication protocol, and the like). Thereby, the controller circuit 416 can communicate the presence of an object detected by the foreign object detector circuit 480 (of FIG. 5) to the controller circuit 516. Also, the controller circuit 416 can communicate the presence detector circuit's 460 detection of the receive antenna 118 within the charging area of the transmit antenna 114 (of FIG. 5) to the controller circuit 516.

Although FIG. 6 shows many different components in functional block forms, an actual physical embodiment may combine one or more functional blocks in a single, unitary component. For example, the clock 560 or the selector circuit 532 may be combined with the controller circuit 516. In another physical embodiment, the components may be included as discrete components. In another physical embodiment, the receive circuitry 210 may comprise a foreign object detector circuit (not illustrated) that may be configured to communicate detection of the foreign object to the receive circuitry 206 or to the transmitter pad 420.

Figure 7:
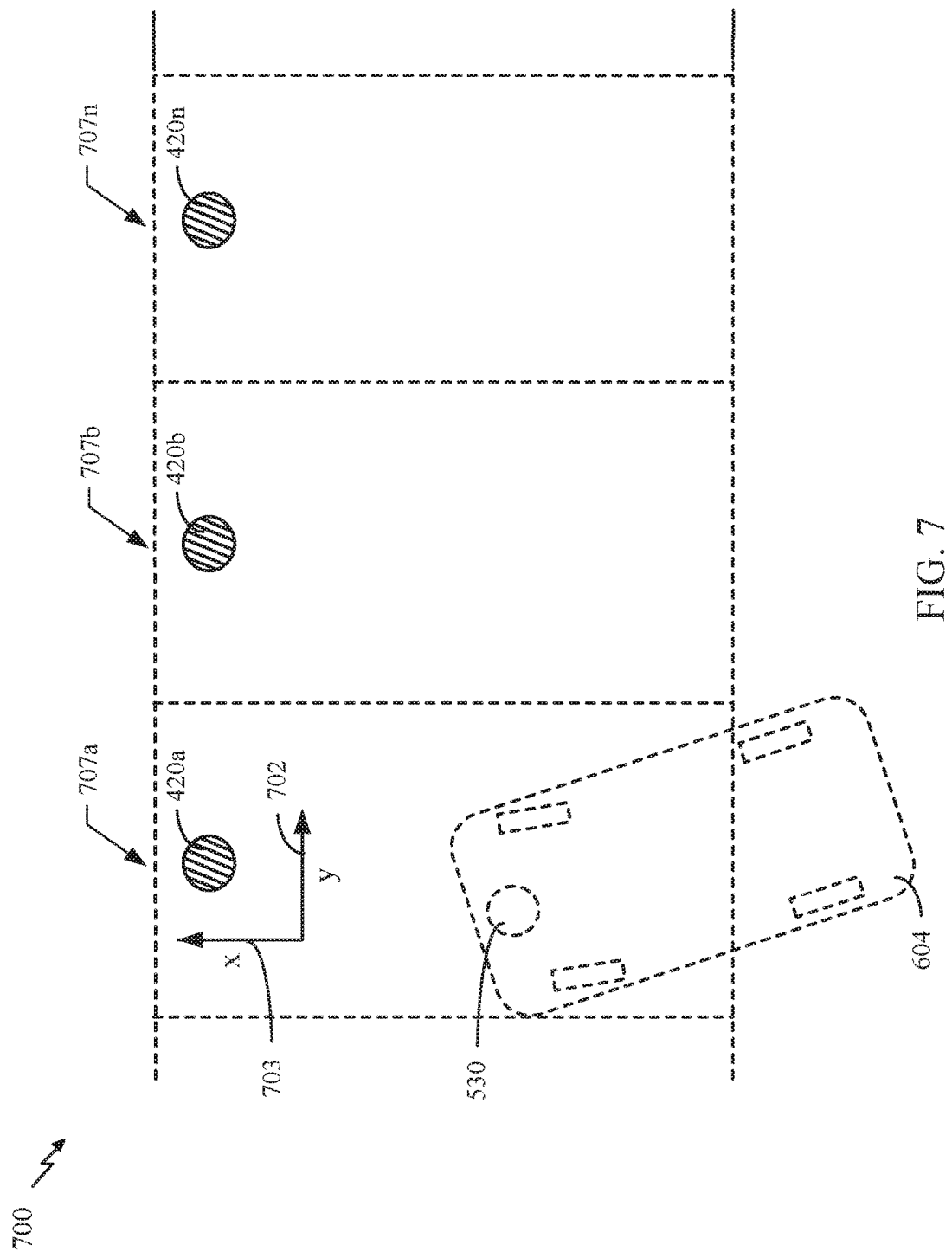
FIG. 7 is a diagram of the electric vehicle of FIG. 1 controlled by a controller circuit 416 of FIG. 5 to approach a wireless power transfer system.

FIG. 7 is a diagram of the electric vehicle 604 of FIG. 1 controlled by the controller circuit 416 of FIG. 5 to approach a wireless power transfer system. FIG. 7 depicts a parking lot 700 comprising a plurality of parking spaces 707a, 707b, . . . 707n, collectively referred to as parking spaces "707." Each parking space 707 may include a transmitter pads 420a, 420b, . . . 420n, respectively, collectively referred to as transmitter pad 420. To enhance the efficiency of a vehicle wireless charging system, the controller circuits 416 may be configured to communicate control signals via the communication link with receiver 108 to guide the electric vehicle 604 along an X direction (depicted by arrow 703 in FIG. 7) and a Y direction (depicted by arrow 702 in FIG. 7) to position the electric vehicle 604 within the parking space 707. For example, the controller circuit's 416 control signals may be communicated over the communicator circuit 472 to communicator circuit 566 of electric vehicle 604 to assist the driver (or an autopilot in case of an automatically driven vehicle) to position the electric vehicle 604 within the parking space 707a. Thus, the receiver pad 530 of the electric vehicle 604 approaches the transmitter pad 420 for wireless power transfer, hereinafter an "approach phase." During the approach phase, the electric vehicle 604, or a portion thereof, may not be detected by the foreign object detector circuit 480 or presence detector circuit 460 (of FIG. 5). The controller circuit 416 may rely on radio positioning principles using the low or high frequency bands. The controller circuit 416 can produce an output indicative of the degree, e.g., a sound or display communicated to the driver (or an autopilot in case of an automatically drive vehicle).

When the electric vehicle 604 is guided to within a few meters (e.g., 1 to 2 meters), the controller circuit 416 is configured to switch from guiding the electric vehicle 604 to aligning the receiver pad 530 with the transmitter pad 420a. For example, as the receiver pad 530 of the electric vehicle 604 approaches the transmitter pad 420, the electric vehicle 604 or a portion thereof is detected by the foreign object detector circuit 480, as described above in connection to FIG. 5. Thus, the foreign object detector circuit 480 can be configured to assist the driver (or an autopilot in the case of an automatically driven vehicle) to align the electric vehicle 604 for wireless power transfer. For example, when a beacon antenna 620 is within generally 1 to 2 meters of one or more of the sense coils 405 (FIG. 5), the foreign object detector circuit 480 detects the beacon antenna 620 indicative of the electric vehicle 604 and communicates detection signals to the controller circuit 416 to assist with aligning of the receiver pad 530 with the transmitter pad 420.

Figure 8:
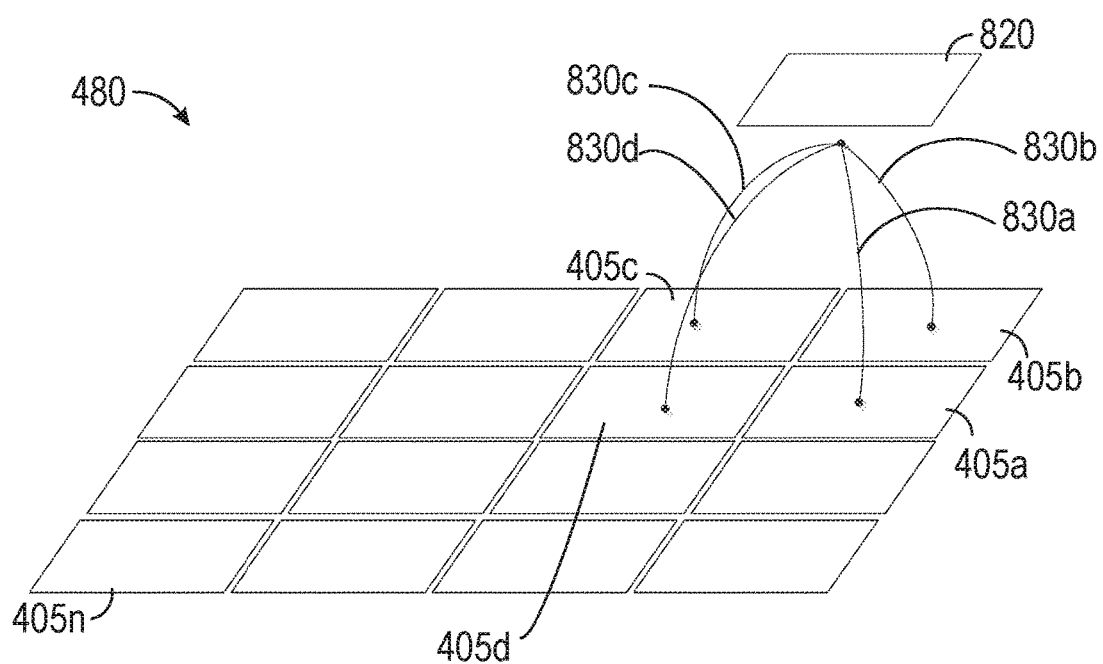
FIG. 8 is a diagram of at least a portion of a foreign object detector circuit 480 of FIG. 5 used to determine the relative position of the electric vehicle of FIG. 1, in accordance with an exemplary implementation.

FIG. 8 is a diagram of at least a portion of a foreign object detector circuit 480 of FIG. 5 used to determine the relative position of the electric vehicle 604 of FIG. 1, in accordance with an exemplary implementation. As shown in the embodiment of FIG. 8, the foreign object detector circuit 480 may comprise a plurality of sense coils 405a, 405b . . . 405n where "n" designates an arbitrary number of sense coils 405a, 405b . . . 405n, collectively hereinafter "405." Although only a 16 sense coils 405 are specifically illustrated, embodiments of the present application are not so limited. The foreign object detector circuit 480 may comprise any number (two or greater) of sense coils 405. For example, the foreign object detector circuit 480 may include 64 or more sense coils 405. The sensitivity of the foreign object detector circuit 480 may be related to the number of sense coils 405 (e.g., the greater number of sense coils 405 the greater the sensitivity of the foreign object detector circuit 480). The arrangement of the sense coils 405 need not be an array, and may be any physical arrangement. Also shown in FIG. 8 is an object 820 positioned overtop of and relative to one or more of the sense coils 405. The object 820 can be a part of the electric vehicle 604 or a foreign object. As described below, the object 820 may be the same as or may comprise the beacon antenna 620 of FIG. 6 detectable by the sense coils 405 to be indicative of the presence and/or position of the electric vehicle 604.

In an exemplary implementation, the foreign object detector circuit 480 comprises a plurality of sense coils 405 configured to communicate with the controller circuit 416 to assist in aligning the receiver pad 530 (of FIG. 6) with the transmitter pad 420. When the object 820 is positioned within the field of one of the sense coils 405, a magnetic coupling is developed between the object 820 and the sense coil 405 (represented with lines 830*a*, 830*b*, 830*c*, and 820*d*, collectively referred to as coupling lines 830). Although only four coupling lines 830 are specifically illustrated, the object 820 may develop the magnetic coupling with any number (one or greater) of sense coils, in accordance with different embodiments. For example, the object 820 may at least be partially coupled to all of the sense coils 405. As described above in connection to FIG. 5, the sense coils 405 are configured to detect the magnetic coupling of the object 820 to the sense coils as described above in connection to FIG. 5. The presence of the object 820 causes a disturbance in the field generated by the sense coil 405 that is detectable by the particular sense coil 405. For example, the disturbance can be caused by a change in the impedance of the object 820 as sensed by one or more of the sense coil 405. As described above, each sense coil 405 is configured to communicate a detection signal to the controller circuit 416 indicative of the disturbance.

The controller circuit 416 may be configured to receive the detection signals from one or more of the plurality of the sense coils 405. One non-limiting advantage of using more than one sense coil 405 is that the location of the object 820 can be determined based on detection signals. For example, as illustrated in FIG. 8, the object 820 may be positioned at least partially above four sense coils 405*a-d*, thereby coupling to at least the sense coils 405*a-d*. As described above, the presence of the object 820 within the sense area of each sense coil 405*a-d* causes a disturbance in the field generated by each sense coil 405. As the object 820 moves relative to, for example, the sense coils 405*a*, the disturbance generates a response (e.g., a change in the complex impedance of the sense coil 405) sensed or detected by the sense coil 405*a* changes. The change in the sensed response may be a change in the strength in the sensed response indicative of the change in the strength or magnitude of the disturbance. For example, as the object 820 moves closer to the sense coil 405*a*, the magnitude disturbance increases such that the strength of the sensed response (e.g., the sensed complex impedance due to the object 820) increases. As another example, as the object 820 moves farther away from the sense coil 405*d*, the magnitude of the sensed response decreases. The detection signals transmitted by the sense coils 405 are indicative of the change in the magnitude or strength of the sensed response.

The controller circuit 416 is configured to receive the detection signals and determine the position of the object 820 relative to each sense coil 405 based on the detection signals. For example, the position of the object 820 can be determined by comparing the detection signal from each sense coil 405. In one implementation, the position of the object 820 may be determined by computing the center-point of the sum of the detection signals from each sense coil 405. As another example, the position of the object 820 may be determined based on the largest detection signal of a particular sense coil 405. As another example, the position of the object 820 may be determined by trilateration of detection signals from two or more or all of the sense coils 405. One non-limiting advantage of a foreign object detector circuit 480 including 64 or more sense coils 405 is that the controller circuit 416 may be able to determine the position of the object to within a few centimeters.

In an exemplary implementation, the controller circuit 416 is configured to communicate with the foreign object detector circuit 480 to assist with aligning the receiver pad 530 of the electric vehicle 604 of FIG. 1 with the transmitter pad 420. For example, the controller circuit's 416 determination of the position of object 820 relative to the sense coils 405 may enable the controller circuit 416 to communicate control signals to the driver (or an autopilot in case of an automatically driven vehicle) to position the object 820. However, the controller circuit 416 needs to be able to identify object 820 as indicative of a component capable of wireless power transfer (e.g., that the object 820 is part of or is the electric vehicle 604). Thus, to distinguish the electric vehicle 604 from just any foreign object, the foreign object detector circuit 480 is configured to detect the beacon antenna 620 (of FIG. 1) and the controller circuit 416 is configured to identify the beacon antenna 620 as indicative of the electric vehicle 604.

For example, as described above, the object 820 may be or may comprise the beacon antenna 620 of FIG. 6 and the foreign object detector circuit 480 can be configured to communicate with the controller circuit 416 to identify the beacon antenna 620. Similar to any foreign object, the sense coils 405 are configured to detect the presence of the beacon antenna 620 within a sense area of one or more each sense coils 405. As described above in connection to FIG. 6, the beacon circuit 610 is configured to modulate, vary, or modify the electrical characteristic of the beacon antenna 620 in a distinctive or identifiable manner. The sense coils 405 detect the changes of electrical characteristic by sensing distinctive changes in the response due to changes in the disturbance of the field generated by each sense coil 405. The detection signals transmitted by the sense coils 405 are indicative of the distinctive changes. The controller circuit 416 receives the detection signals from the sense coils 405, and identifies the foreign object as the beacon antenna 620 based on retrieving the modulation or variation of the electrical characteristic of the beacon antenna 620. The controller circuit 416 is configured to determine that the presence of beacon antenna 620 is indicative of an electric vehicle 604. Accordingly, the controller circuit 416 may be configured to use the position determination of the beacon antenna 620 relative to the sense coils 405, as described above, in conjunction with the identification that the beacon antenna 620 is indicative of the electric vehicle 604 to assist with aligning the receiver pad 530 with the transmitter pad 420.

In an exemplary implementation, one of the electrical characteristics of the beacon antenna 620 is an impedance of the beacon antenna 620. Thus, the impedance of the beacon antenna 620, as the beacon antenna 620 enters the field generated by the sense coils 405, causes a measurable disturbance in the field. The sense coils 405 are configured to sense the changes in the impedance of the beacon antenna 620 based on the change in the current flow through the sense coils 405 to generate the field. This sensed change in the measured impedance is communicated to the controller circuit 416 as a detection signal. Accordingly, the sense coils 405 detect the presence of the beacon antenna 620.

To identify the beacon antenna 620 as part of the electric vehicle 604, the beacon circuit 610 imparts a distinctive impedance modulation to the impedance of the beacon antenna 620. The distinctive impedance modulation causes a distinctive disturbance of the field sensed by each sense coil 405. The distinctive change in the impedance is communicated to the controller circuit 416 as the detection signal. Based on the distinctive modulation, the controller circuit 416 is able to identify that the beacon antenna 620 is not a foreign object and is indicative of the electric vehicle 604. The controller circuit 416 is able to make this determination because a foreign object generally produces a constant change in the measured impedance as the foreign object approaches the sense coils 405 opposed to a modulated change.

Figure 9A:
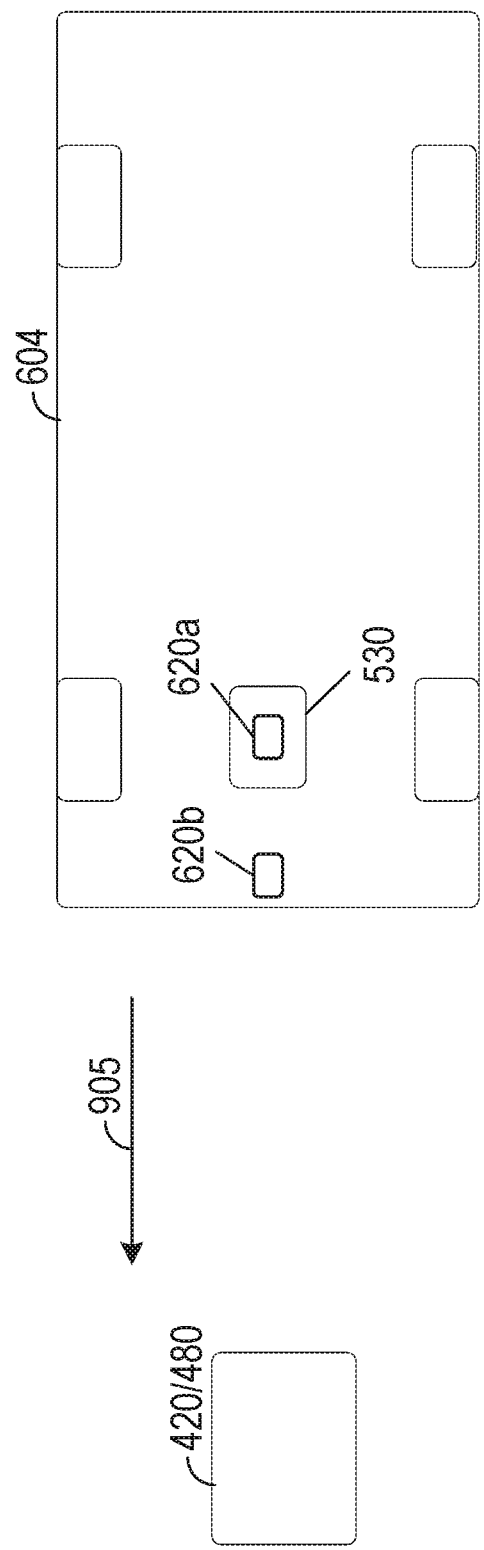
FIGS. 9A-9C are diagrams of the electric vehicle of FIG. 1 controlled by a controller circuit 416 of FIG. 5 to align with the wireless power transfer system 100 of FIG. 2, in accordance with an exemplary implementation.
Figure 9B:
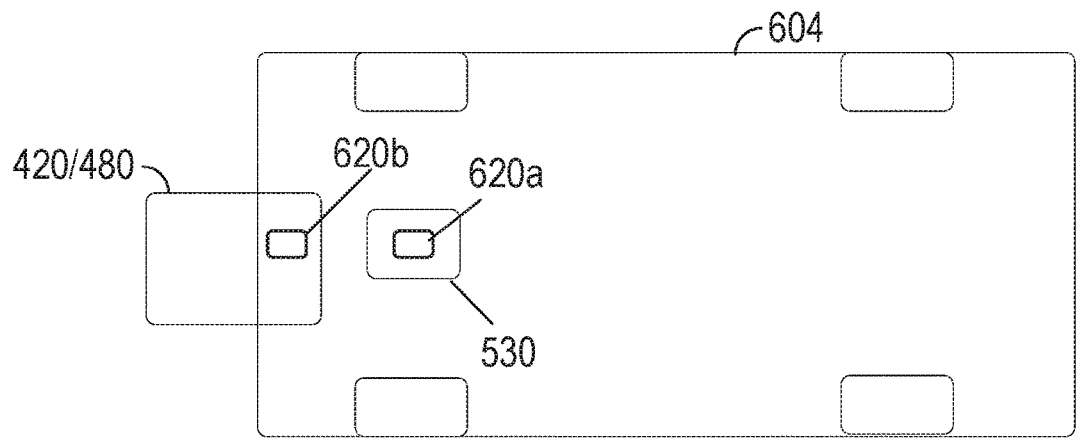
Figure 9C:
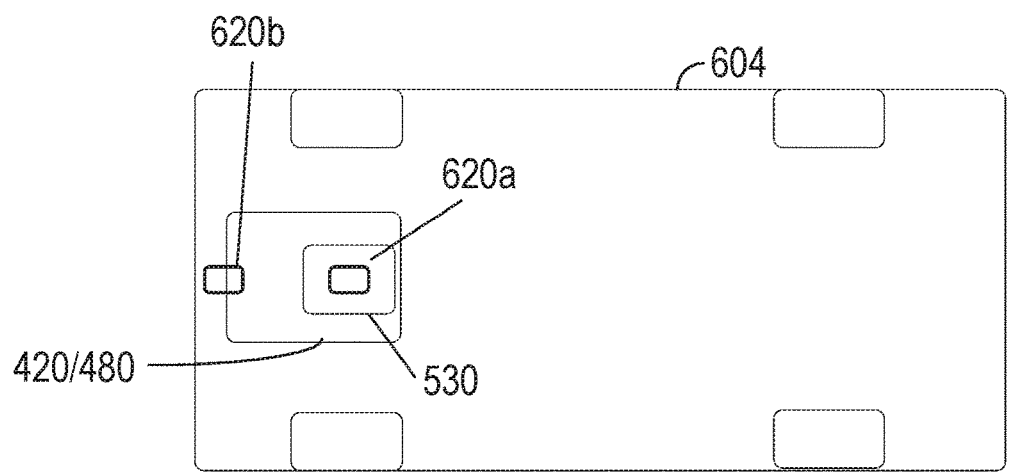

FIGS. 9A-9C are diagrams of the electric vehicle 604 of FIG. 1 controlled by controller circuit 416 of FIG. 5 to align with the wireless power transfer system of FIG. 2, in accordance with an exemplary implementation. FIGS. 9A-9C illustrate the electric vehicle 604 at different positions relative to the transmitter pad 420 of FIG. 5 during an approach phase (e.g., FIG. 9A) and alignment of the receiver pad 530 of FIG. 6 with the transmitter pad 420 (e.g., FIGS. 9B and 9C) for wireless power transfer. The electric vehicle 604 is the same electric vehicle in each of FIGS. 9A-9C.

FIGS. 9A-9C depict the electric vehicle 604 comprising the receiver pad 530 and a plurality of beacon antennas 620a and 620b (e.g., beacon antenna 620 of FIG. 6), collectively referred to as beacon antennas "620." In one implementation, the beacon antenna 620a is integrated into the receiver pad 530 and the beacon antenna 620b is integrated into or attached to the electric vehicle 604 at different location (e.g., in the front bumper of the electric vehicle 604 as illustrated in FIGS. 9A-9C). In some embodiments, each beacon antenna 620 may have its own beacon circuit 610, rather than multiple beacon antennas 620a and 620b sharing the beacon circuit 610 illustrated in FIG. 5. The beacon antennas 620 may be controlled to similarly vary their corresponding electrical characteristics or the variation may be different. Although only two beacon antennas 620 are specifically illustrated, the electric vehicle 604 may comprise any number (one or greater) of beacon antennas positioned at any area of the electric vehicle 604 in accordance with different embodiments. FIGS. 9A-9C also depict a transmitter pad 420 of FIG. 5 comprising a foreign object detector circuit 480, in accordance with an exemplary implementation.

In an exemplary implementation, the controller circuit 416 is configured to assist with aligning the receiver pad 530 of the electric vehicle 604 with the transmitter pad 420 for wireless power transfer. The electric vehicle 604 has a geometrical structure where the plurality of beacon antennas 620 and the receiver pad 530 are positioned therein. The beacon antennas 620 are configured to be physically positioned relative to the receiver pad 530. The relative positions of the receiver pad 530 and beacon antennas 620 and geometrical structure of the electric vehicle 604 may be known and consistent for each make and model of electric vehicles. For example, the relative positions of the beacon antennas 620 and receiver pad 530 can be determined based on identifying the make and model of the electric vehicle 604. This physical relationship may be stored in the memory 470 or communicated via the communication link through communicator circuit 472 of FIG. 5, and can be communicated to the controller circuit 416.

In various implementations, the controller circuit 416 of FIG. 5 is configured to utilize the identification information, described above in connection to FIG. 6, to assist in aligning the receiver pad 530 with the transmitter pad 420. For example, the controller circuit 416 may be configured retrieve the relative positions of the beacon antennas 620 and receiver pad 530 based on the identification information. For example, the identification information is indicative of the make and model of the electric vehicle 604, thus the physical structure of the electric vehicle 604 can be retrieved (e.g., from the memory 470 or via communication between communicator circuit 472 of FIG. 5 and communicator circuit 566 of FIG. 6 by the controller circuit 416). As described above in connection to FIG. 8, the controller circuit 416 is also configured to determine the position of the beacon antenna 620 relative to the sense coils 405 of the foreign object detector circuit 480. The physical position of the sense coils 405 relative to the transmitter pad 420 may be stored in the memory 470 (or communicated via communicator circuit 472). Thus, the controller circuit 416 can determine the position of the beacon antenna 620 relative to the transmitter pad 420. In one embodiment, the controller circuit 416 may be configured to convert the position of the beacon antenna 620 relative to the sense coils 405 to the position of the receiver pad 530 relative to the transmitter pad 420 based on the position of the beacon antenna 620 relative to the receiver pad 530 and the position of the transmitter pad 420 relative to the sense coils 405. Based on the physical relationship of the components of the electric vehicle 604 and the position of the beacon antennas 620 relative to the transmitter pad 420, the controller circuit 416 is configured to determine alignment information for aligning the receiver pad 530 with the transmitter pad 420. The controller circuit's 416 control signals may be indicative of the alignment information and can be communicated over the communicator circuit 472 to communicator circuit 566 of electric vehicle 604 to assist the driver (or an autopilot in case of an automatically driven vehicle) to position the electric vehicle 604 for wireless power transfer. Therefore, the controller circuit 416 may be one example of a means for determining alignment information.

As shown in FIG. 9A, the electric vehicle 604 is controlled by the controller circuit 416 of FIG. 5 to approach a wireless power transfer system, for example, as previously described in connection to FIG. 7. FIG. 9A also depicts an approach direction (represented by an arrow 905 in FIG. 9A) that is illustrative of a direction of travel of the electric vehicle 604 during the approach phase. As described above, the controller circuit 416 may be configured to communicate control signals via the communication link to the controller circuit 516 to guide the electric vehicle 604 toward the transmitter pad 420. During the approach phase, the electric vehicle 604, or a portion thereof, may not be detected by the foreign object detector circuit 480 or the presence detector circuit 460 (of FIG. 5). The controller circuit 416 can produce an output indicative of the degree, e.g., a sound or display communicated to the driver (or an autopilot in case of an automatically drive vehicle).

FIG. 9B is a diagram of the electric vehicle 604 controlled by the controller circuit 416 of FIG. 5 to align the receiver pad 530 with the transmitter pad 420 when a beacon antenna 620 is within a few meters (e.g., 1 to 2 meters) of the foreign object detector circuit 480. As described above in connection to FIG. 7, when the receiver pad 530 is within a few meters of the transmitter pad 420, the controller circuit 416 is configured to switch from guiding the electric vehicle 604 to aligning the receiver pad 530 with the transmitter pad 420. As the receiver pad 530 of the electric vehicle 604 approaches the transmitter pad 420, the electric vehicle 604 or a portion thereof is detected by the foreign object detector circuit 480. For example, as illustrated in FIG. 9B, prior to the receiver pad 530 aligning with the transmitter pad 420, the beacon antenna 620*b* is detected by the foreign object detector circuit 480 (as described above with reference to FIG. 5). The sense coils 405 of the foreign object detector circuit 480 detect the beacon antenna 620*b* and transmit detection signals to the controller circuit 416. As described above, the controller circuit 416 receives the detection signals, identifies the electric vehicle 604, and determines the position of the beacon antenna 620*b* relative to the sense coils 405 (not shown in FIGS. 9A-9C). The controller circuit's 416 control signals are then communicated to the driver (or an autopilot in case of an automatically driven vehicle) to assist in aligning the receiver pad 530 with the transmitter pad 420.

FIG. 9C is a diagram of the electric vehicle 604 controlled by the controller circuit 416 to align the receiver pad 530 with the transmitter pad 420 when receiver pad 530 is within a few meters (e.g., 1 to 2 meters) of the transmitter pad 420. As illustrated in FIG. 9C, the beacon antenna 620*a* is integrated into receiver pad 530. Thus, the controller circuit 416 is configured to send control signals to assist the driver (or an autopilot in case of an automatically driven vehicle) to align the receiver pad 530 to within a few centimeters of the transmitter pad 420. For example, the beacon antenna 620*a* is detected by the foreign object detector circuit 480 integrated into the transmitter pad 420. The sense coils 405 detect the beacon antenna 620*a* associated with the receiver pad 530 and transmit detection signals to the controller circuit 416. As described above, the controller circuit 416 receives the detection signals, identifies the electric vehicle 604, and determines the position of the beacon antenna 620*a* relative to the sense coils 405. Based on this determination, the controller circuit 416 can determine the position of the receiver pad 530 relative to transmitter pad 420. The controller circuit's 416 control signals are then communicated to the driver (or an autopilot in case of an automatically driven vehicle) to assist in aligning the receiver pad 530 with the transmitter pad 420.

One non-limiting advantage of the electric vehicle 604 comprising a plurality of beacon antenna 620 is that range for which alignment information may be communicated to the driver (or an autopilot in case of an automatically driven vehicle) can be increased. The range of the beacon antenna 620 in some embodiments may be limited by the electrical properties of the various components (e.g., 0.5 meters for a passive beacon antenna 620 of FIG. 10). By including multiple beacon antennas 620 distributed about the electric vehicle 604, the controller circuit 416 may identify the electric vehicle 604 and determine the relative position of the receiver pad 530 before it is within a few meters of the transmitter pad 420. Although the preceding description characterizes the foreign object detector circuit 480 as integrated into the transmitter pad 420, embodiments of the present application are not so limited. The sense coils 405 may be positioned anywhere relative to the transmitter pad 420 as to provide early detection and alignment assistance.

In one implementation, the controller circuit 416 is configured to selectively active or disable the transmitter pad 420 based on the identification information. For example, as described above, the controller circuit 416 is configured to control the selector circuit 430 by sending control signals to the selector circuit 430. Based on the controller circuit's 416 control signals, the selector circuit 430 is configured to selectively activate or disable the transmitter pad 420 (or the transmit antenna 114) based on the identifying the electric vehicle 604. The selector circuit 430 may be configured to activate the transmitter pad 420 when the controller circuit 416 identifies a particular electric vehicle 604, while disabling the transmitter pad 420 for other electric vehicles.

Figure 10:
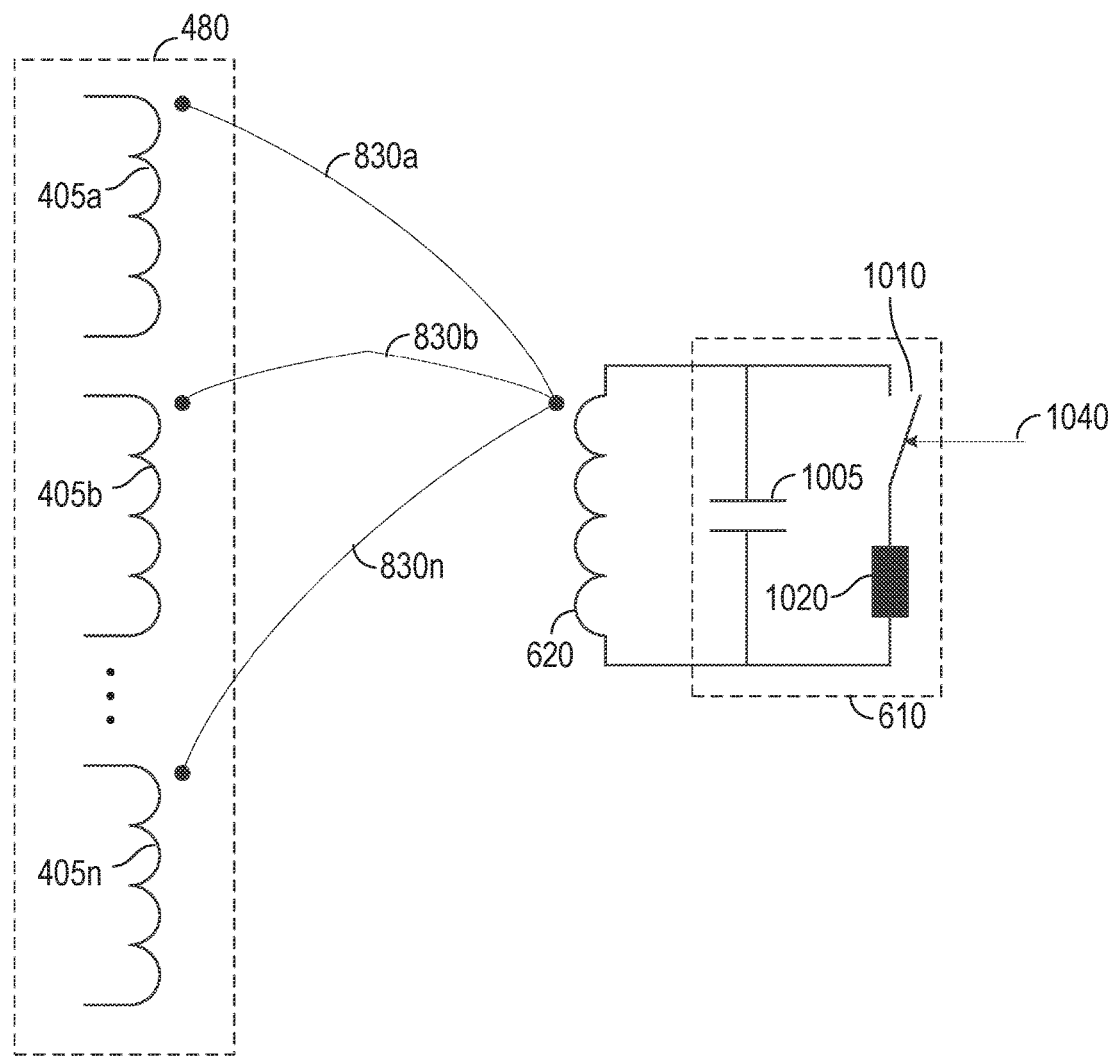
FIG. 10 is a schematic diagram of at least a portion of a beacon antenna 620 of FIG. 6 and a foreign object detector circuit 480 of FIG. 5, in accordance with an exemplary implementation.

FIG. 10 is a schematic diagram of at least a portion of a beacon antenna 620 of FIG. 6 and a foreign object detector circuit 480 of FIG. 5, in accordance with an exemplary implementation. FIG. 10 also illustrates an exemplary implementation of the beacon antenna 620 configured as a passive beacon antenna. As used herein, the beacon antenna 620 is an example of an object that is detectable by the foreign object detector circuit 480 indicative of an electric vehicle 604.

FIG. 10 also illustrates at least a portion of the foreign object detector circuit 480 comprising a plurality of sense coils 405*a*, 405*b*, . . . 405*n*, where "n" designates an arbitrary or predetermined number of sense coils 405*a*, 405*b*, . . . 405*n*, collectively hereinafter "405." Although only three sense coils 405 are specifically illustrated, the foreign object detector circuit 480 may comprise any number of sense coils 405, as described above. As illustrated in the embodiment of FIG. 10, the sense coils 405 may be configured as a coil with one or more windings. As described in connection to FIG. 5, the sense coils 405 may be configured to generate a magnetic field in a sense area associated with each sense coil 405. The sense coils 405 are also configured to detect an object (e.g., the beacon antenna 620) based on a magnetic coupling (represented by lines 830*a*, 830*b*, . . . 830*n*, collectively referred to as coupling lines 830) developed between the beacon antenna 620 and each sense coil 405.

In one exemplary implementation, the sense coils 405 and the beacon antenna 620 are configured according to a mutual resonant relationship. As described above in connection to FIG. 3, when the resonant frequency of the beacon antenna 620 and the resonant frequency of the sense coils 405 are within substantially the same range or very close, transmission losses between the sense coils 405 and the beacon antenna 620 are minimal. As such, the disturbance sensed by the sense coils 405 may be provided over a larger distance and with higher sensitivity in contrast to purely inductive solutions that may require large antennas which are very close (e.g., sometimes within millimeters). Resonant inductive coupling techniques may thus allow for improved object detection over various distances and with a variety of inductive antenna configurations. Thus, each sense coils 405 may output a time varying magnetic (or electromagnetic) field with a frequency corresponding to its resonant frequency. When the beacon antenna 620 is within the sense area, the time varying magnetic (or electromagnetic) field may be absorbed as energy by the beacon antenna 620. As described above, if the beacon antenna 620 is configured to resonate at the frequency of the sense coils 405 then the beacon antenna 620 may efficiently absorb energy. By efficiently absorbing energy, the disturbance in the magnetic field due to the beacon antenna 620 may be maximized, such that the sensitive of the sense coils 405 in detecting the response is similarly maximized.

As described in connection to FIG. 6, the beacon antenna 620 is coupled to the beacon circuit 610. In an exemplary implementation illustrated in FIG. 10, the beacon circuit 610 comprises a capacitor 1005, a switch 1010, and a load 1020 electronically connected to the beacon antenna 620. The capacitor 1005 is electronically connected in parallel to the beacon antenna 620 and configured to create resonance with the beacon antenna 620. FIG. 10 also depicts the load 1020 connected in parallel with the beacon antenna 620 and configured to impart impedance change onto the beacon antenna 620 based on a value of the load 1020. The load 1020 may be referred to as a "resistive" load, a "capacitive"

load, or an "inductive" load. As used herein, the load 1020 is an example of electrical element configured to impact the impedance of the beacon antenna 620 such that the impact can be sensed by the sense coils 405. The switch 1010 is electrically connected in series with the load 1020 and configured to control the load 1020.

In an exemplary implementation, the controller circuit 516 of FIG. 6 (not shown in FIG. 10) send control signals 1040 (shown as an arrow for illustrative purposes only) to the beacon circuit 610. Based on the control signals 1040, the beacon circuit 610 is configured to modulate or affect the impedance of the beacon antenna 620 by varying the value of the load 1020 at a given frequency, hereinafter a "modulation frequency." For example the control signals 1040 may include instructions for controlling the switch 1010 indicative of a modulation scheme or pattern, as described herein. Based on the state of the switch 1010, the value of the load 1020, as applied to the beacon antenna 620, is varied and causes a change in the impedance of the beacon antenna 620. Accordingly, the controller circuit 516 can be configured to control the beacon circuit 610 to modulate the switch 1010 in a distinctive or identifiable scheme or pattern. The varying of the load 1020 thereby causes a distinctive impedance modulation of the beacon antenna 620 that, as described above in connection to FIG. 8, can be sensed by the sense coils 405, for example, as a stronger or weaker disturbance.

An exemplary modulation scheme may be implemented where the value of the load is 0Ω. As such, based on the control signals 1040, the switch 1010 can be toggled between an open and a closed state varying the impact of the load 1020 on the impedance of the beacon antenna 620. Accordingly, the impedance of the beacon antenna 620 is similarly toggled. In some implementations, the load 1020 comprises a real value configured to generate a resonance dampening when the switch 1010 is closed. In another implementation, the load 1020 comprises a complex value configured to generate a frequency shift of the beacon antenna 620. Although a specific modulation scheme is described herein, the controller circuit 516 may be configured to control the beacon circuit 610 through any modulation scheme as long as it is configured to impact the resonance and/or impedance of the beacon antenna 620.

As described above, the controller circuit 516 is configured to control the switch 1010 based on the control signals 1040. In one implementation, the control signals 1040 may be indicative of the modulation frequency applied to the switch 1010. In some implementations, the modulation frequency may be configured to be substantially similar or very close to the scan rate of the foreign object detector circuit 480 (as described above in connection to FIG. 5). For example, where the scan frequency is 6.25 Hz, the load 1020 may be modulated at a frequency of 3.125 Hz. Although a specific example of the modulation frequency has been described herein, other implementations are possible. For example, the scan rate may be increased (e.g., to 25 Hz), and the modulation frequency may similarly be increased. One non-limiting advantage of a higher modulation frequency is that the identification information described above in connection to FIGS. 9A-9C may be encoded into in the modulation scheme.

Figure 11:
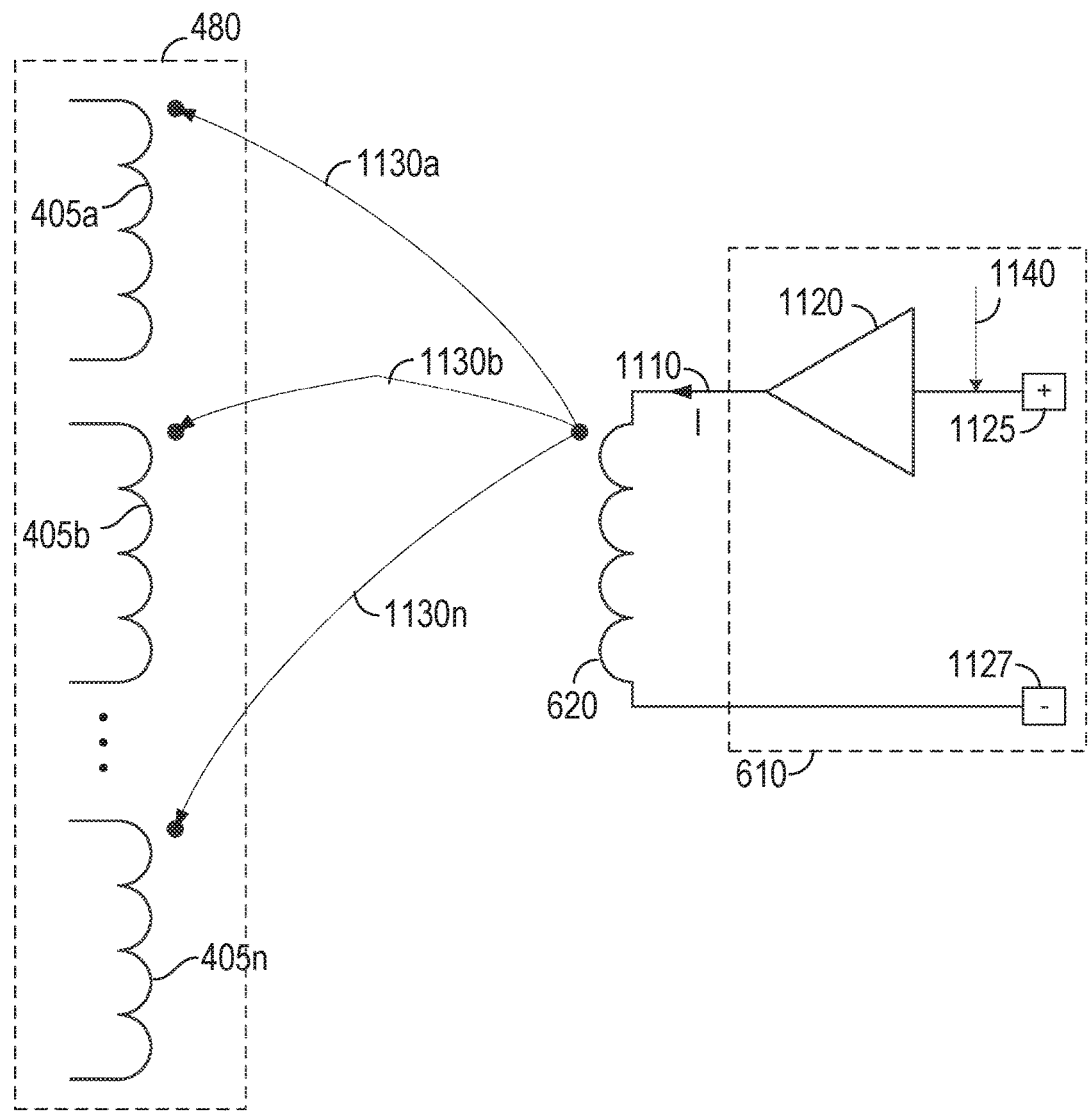
FIG. 11 is a schematic diagram of at least a portion of a beacon antenna 620 of FIG. 6 and a portion of a foreign object detector circuit 480 of FIG. 5, in accordance with another exemplary implementation.

FIG. 11 is a schematic diagram of at least a portion of a beacon antenna 620 of FIG. 1 and a portion of a foreign object detector circuit 480 of FIG. 5, in accordance with another exemplary implementation. FIG. 11 illustrates another exemplary implementation of the beacon antenna 620 configured as an active beacon antenna. In some embodiments, the beacon antenna 620 illustrated in FIG. 11 may be detected at distances of approximately 1 to 2 meters opposed to the shorter detection distances of the beacon antenna 620 of FIG. 10. As illustrated in the embodiment of FIG. 11, the beacon antenna 620 may be configured as a coil with one or more windings. As used herein, the beacon antenna 620 is another example of an object that is detectable by the foreign object detector circuit 480 indicative of the electric vehicle 604.

As described in connection to FIG. 6, the beacon antenna 620 is coupled to the beacon circuit 610. In the exemplary implementation illustrated in FIG. 11, the beacon antenna 620 can be driven with a current I (represented by the arrow 1110). The beacon antenna 620 can be connected to a positive terminal 1125 and a negative terminal 1127 of a source (not shown in FIG. 11) configured to feed the current I to the beacon antenna 620 through an amplifier 1120. The source may be any type of electrical power source, for example, a battery of the electric vehicle 604. The beacon antenna 620 may be configured to generate a magnetic field based on current I. The current I may be configured to be distinctive and indicative of the beacon antenna 620.

Similar to FIG. 10, FIG. 11 also illustrates at least a portion of the foreign object detector circuit 480 comprising a plurality of sense coils 405a, 405b, 405n where "n" designates an arbitrary or predetermined number of sense coils 405a, 405b, . . . 405n, collectively hereinafter "405." However, in the implementation of FIG. 11, the sense coils 405 may be configured as receiver antennas configured to receive a signal from the beacon antenna 620 (represented by arrows 1130a, 1130b, . . . 1130n). In some embodiments, the sense coils 405 illustrated in FIG. 11 may be configured to not generate a magnetic field. When one or more sense coils 405 are within the magnetic field generated by the beacon antenna 620, the field may induce a voltage in the sense coils 405. The sense coils 405 are configured to measure the induced voltage across each sense coil 405, thereby receiving a signal from the beacon antenna 620. Based on the measured voltage, the sense coils 405 are configured to send a detection signal indicative of the received signal to the controller circuit 416 of FIG. 5 (not shown in FIG. 11). Based on the detection signals, as described above in connection to FIGS. 5 and 8, the controller circuit 416 may determine the position of the beacon antenna 620 and identify the beacon antenna 620 as part of the electric vehicle 604.

As described above, the controller circuit 516 of FIG. 6 (not shown in FIG. 11) is configured to control the beacon circuit 610. In one implementation, the controller circuit 516 sends control signals 1140 (represented as an arrow for illustrated purposes only) indicative of the amplitude, frequency, and/or phase of the current I to be applied to the beacon antenna 620 by the beacon circuit 610. The beacon circuit 610 may be configured to modulate the amplitude, frequency, and/or phase based on the control signals 1140. Accordingly, the control signals 1140 may be indicative of the distinctive signal to be transmitted by the beacon antenna 620. In an exemplary implementation, the frequency of the current I, thus the frequency of the signal transmitted by the beacon antenna 620, may be configured to substantially similar to or very close to the resonance frequency range of the foreign object detector circuit 480. In one embodiment, the frequency range is approximately 3.0 MHz. In some embodiments, the amplitude of the current I is configured to be substantially the same order of magnitude as the current (e.g., 30-100 $mA_{RMS}$). In another implementation, alternatively or in combination, the current I may be switched on and off via a switch (not shown in FIG. 11), similar to the operation of the beacon circuit 610 of FIG. 10, thereby modulating the current I from off to on.

In another implementation, the current I need not be modulated. The controller circuit 416 may be configured to identify the beacon antenna 620 based on an un-modulated current I. For example, the current I can be a predetermined current and the beacon antenna 620 may be configured to generate a continuous wave signal base on the control signals 1140. The sense coils 405 receive the continuous wave signal and send detection signals indicative of the continuous wave signal to the controller circuit 416. The controller circuit 416 is also configured to retrieve information indicative of the continuous wave signal to confirm that the received continuous wave signal is indicative of the beacon antenna 620. For example, the information indicative of the current I may be stored in the memory 470 of FIG. 5 or be communicated to the controller circuit 416 via the communication link as described above in connection to FIGS. 5 and 6. The controller circuit 416 may be configured to compare the detection signals with the retrieved information and identify the beacon antenna 620. As another example, where the sense coils 405 do not generate a magnetic field, the electric vehicle 604 (or other objects) may not be detected by the foreign object detector circuit, thus the received continuous wave signal may indicative of the beacon antenna 620.

Figure 12:
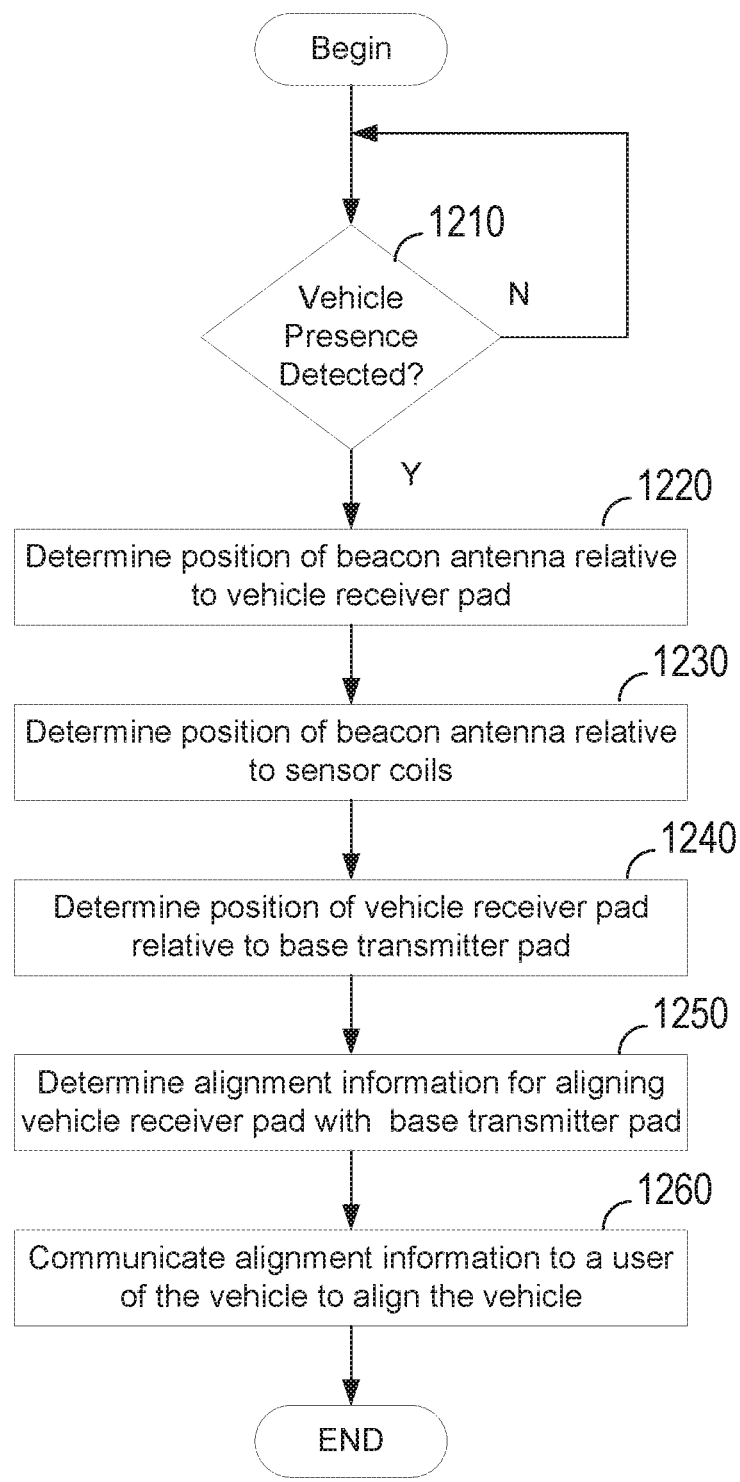
FIG. 12 illustrates a flowchart depicting a method of determining alignment information of the electric vehicle 604 of FIG. 1 for aligning the electric vehicle 604 with the wireless power transfer system 100 of FIG. 2, in accordance with an exemplary implementation.

FIG. 12 illustrates a flowchart depicting a method of determining alignment information of the electric vehicle 604 of FIG. 1 for aligning the electric vehicle 604 with the wireless power transfer system 100 of FIG. 2, in accordance with an exemplary implementation. As described in connection to FIG. 5, the controller circuit 416 may determine alignment information for aligning the receiver pad 530 of FIG. 6 with the transmitter pad 420 of FIG. 5 when the foreign object detector circuit 480 of FIG. 5 detects the beacon antenna 620 of FIG. 6 within the sense area of the sensor coils 405 of FIG. 5. Although the process in FIG. 11 is illustrated in a particular order, in certain embodiments the blocks herein may be performed in a different order, or omitted, and additional blocks can be added. The process of the illustrated embodiment may be implemented in any controller circuit 416 of FIG. 5 or foreign object detector circuit 480 in order to determine alignment information for aligning the receiver pad 530 with the transmitter pad 420 when the foreign object detector circuit 480 detects the beacon antenna 620 within the sense area of the sensor coils 405.

At block 1210, the controller circuit 416 may determine whether the electric vehicle 604 is present within the sense area of one or more sensor coils 405, as described in connection to FIGS. 5 and 6. As shown in the embodiment of FIG. 11, if the controller circuit 416 determines that the electric vehicle 604 is present, the method proceeds to block 1220. If the electric vehicle 604 is not present or not detected within the sense area of one or more sensor coils 405, the method returns to block 1210.

At block 1220, the controller circuit 416 may determine the position of the beacon antenna 620 relative to the receiver pad 530 of the electric vehicle 604. For example, as described in connection to FIG. 8, the controller circuit 416 may identify the particular electric vehicle 604 based on the modulated electrical characteristic and retrieve the relative positions of the beacon antenna 620 and receiver pad 530 of the particular electric vehicle 604. At block 1230, the controller circuit 416 may determine the position of the beacon antenna 620 relative to the sensor coils 405, for example, based on a comparison of the magnitude of the change in the disturbance sensed at each sensor coil 405 in response to the presence of the beacon antenna 620 (e.g., the electric vehicle 604), as described above in connection to FIG. 8. At block 1240, the controller circuit 416 may determine the position of the receiver pad 530 relative to the transmitter pad 420, for example, as described above in connection to FIGS. 9A-9C.

At block 1250, the controller circuit 416 may determine alignment information for aligning the receiver pad 530 with the transmitter pad 420, for example, as described above in connection to FIGS. 9A-9C. At block 1260, the controller circuit 416 may communicate the alignment information to the user of the electric vehicle 604 (or an autopilot in case of an automatically driven vehicle) for aligning the electric vehicle 604 for wireless power transfer.

It will be understood that the appropriate circuits may be used in alternative embodiments depending on the circumstances in which the respective wireless power transfer system is expected to operate. Furthermore, the disclosure is not limited to any particular receiver-side means of generating a current in the receiver inductor and the voltage transformer, current transformer, and reversible rectifier techniques are discussed herein by way of example only.

Wirelessly transferring power may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field) may be received, captured by, or coupled by a "receiving coil" to achieve power transfer.

An electric vehicle is used herein to describe a remote system, an example of which is a vehicle that includes, as part of its locomotion capabilities, electrical power derived from a chargeable energy storage device (e.g., one or more rechargeable electrochemical cells or other type of battery). As examples, some electric vehicles may be hybrid electric vehicles that include a traditional combustion engine for direct locomotion or to charge the vehicle's battery. Other electric vehicles may draw all locomotion ability from electrical power. An electric vehicle is not limited to an automobile and may include motorcycles, carts, scooters, and the like. By way of example and not limitation, a remote system is described herein in the form of an electric vehicle (EV). Furthermore, other remote systems that may be at least partially powered using a chargeable energy storage device are also contemplated (for example, electronic devices such as personal computing devices and the like).

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations. For example, means for charging an electric vehicle may comprise the transmit antenna 114 and means for disabling and means for maintaining activation may comprise the controller circuit 516.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the embodiments.

The various illustrative blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The blocks or steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and blu ray disc where disks usually reproduce data magnetically, while discs reproduce data optically with lasers. Combinations of the above should also be included within the scope of computer readable media. The processor and the storage medium may reside in an ASIC.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

Various modifications of the above described embodiments will be readily apparent, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus for determining alignment information of a vehicle, the vehicle comprising an antenna circuit configured to modulate one or more electrical characteristics of the antenna circuit, the apparatus comprising:
   a plurality of sensor circuits configured to generate a plurality of magnetic fields, at least one sensor circuit of the plurality of sensor circuits configured to sense the modulated electrical characteristic of the antenna circuit when the antenna circuit couples to the at least one sensor circuit via one of the plurality of magnetic fields; and
   a controller circuit configured to determine alignment information of the vehicle based on the sensed modulated electrical characteristic.

2. The apparatus of claim 1, wherein the at least one sensor circuit senses the modulated electrical characteristic as a modulated or varied impedance of the antenna circuit.

3. The apparatus of claim 1, wherein each sensor circuit of the plurality of sensor circuits comprises a coil having one or more windings, the one or more windings driven with a current to generate one of the plurality of magnetic fields within a sense area above the at least one sensor circuit.

4. The apparatus of claim 1, wherein the one or more electrical characteristics are modulated based on a distinct modulation pattern that uniquely identifies the antenna circuit, wherein the at least one sensor circuit is configured to sense the distinctive modulation pattern based on a distinct change of the disturbance in a magnetic field of the at least one sensor circuit in response to a degree of coupling to the antenna circuit.

5. The apparatus of claim 1, wherein at least two or more sensor circuits of the plurality of sensor circuits are configured to sense the modulated electrical characteristic when the antenna circuit couples to the two or more sensor circuits, wherein the controller circuit is configured determine a position of the antenna circuit relative to the at least two sensor circuits based on a comparison of a magnitude of the sensed modulated electrical characteristic at each of the two or more sensor circuits.

6. The apparatus of claim 1, wherein the modulated electrical characteristic uniquely identifies the vehicle, wherein the controller circuit is configured to retrieve a position of the antenna circuit on the vehicle and a position of a power receiving circuit on the vehicle based on uniquely identifying the vehicle via the sensed modulate electrical characteristic and determine a position of the antenna circuit relative to the power receiving circuit of the vehicle.

7. The apparatus of claim 1, further comprising a power transmitting circuit positioned relative to at least two sensor circuits, wherein the controller circuit is configured to convert a position of the antenna circuit relative to the at least two sensor circuits to a position of the power receiving circuit relative to the power transmitting circuit based on the position of the antenna circuit relative to the power receiving circuit and a position of the power transmitting circuit relative to the at least two sensor circuits.

8. The apparatus of claim 1, wherein the controller circuit is configured to determine alignment information for aligning a power receiving circuit with a power transmitting circuit based on a position of the power receiving circuit relative to the power transmitting circuit.

9. The apparatus of claim 1, wherein the controller circuit is configured to communicate the alignment information to a user of the vehicle for aligning a power receiving circuit on the vehicle with a power transmitting circuit positioned relative to the sensor circuits.

10. The apparatus of claim 1, wherein the plurality of sensor circuits are further configured to detect an object other than the antenna circuit of the vehicle.

11. A method for determining alignment information of a vehicle, the vehicle comprising an antenna circuit configured to modulate one or more electrical characteristics of the antenna circuit, the method comprising:
generating, by a plurality of sensor circuits, a plurality of magnetic fields;
sensing, by at least one sensor circuit of the plurality of sensor circuits, the modulated electrical characteristic of the antenna circuit when the antenna circuit couples to the at least one sensor circuit via one of the plurality of magnetic fields; and
determining alignment information of the vehicle based on the sensed modulated electrical characteristic.

12. The method of claim 11, wherein sensing the modulated electrical characteristic comprises sensing a modulated or varied impedance of the antenna circuit.

13. The method of claim 11, wherein generating a plurality of magnetic fields comprises driving one or more windings of the plurality of sensor circuits with a current to generate one of the plurality of magnetic fields within a sense area above the at least one sensor circuit.

14. The method of claim 11, further comprising:
sensing a distinctive modulation pattern based on a distinct change of the disturbance in a magnetic field of the at least one sensor circuit in response to a degree of coupling to the antenna circuit, wherein the electrical characteristic is modulated based on the distinct modulation pattern; and
uniquely identifying the antenna circuit based on the sensed distinct modulation pattern.

15. The method of claim 11, further comprising:
sensing the modulated electrical characteristic by at least two or more sensor circuits of the plurality of sensor circuits when the antenna circuit couples to the two or more sensor circuits; and
determining a position of the antenna circuit relative to the at least two sensor circuits based on a comparison of a magnitude of the sensed modulated electrical characteristic at each of the two or more sensor circuits.

16. The method of claim 11, further comprising:
uniquely identifying the vehicle based on the sensed modulated electrical characteristic;
retrieving a position of the antenna circuit on the vehicle and a position of a power receiving circuit on the vehicle based on uniquely identifying the vehicle; and
determining a position of the antenna circuit relative to the power receiving circuit of the vehicle.

17. The method of claim 11, further comprising converting a position of the antenna circuit relative to the at least two sensor circuits to a position of the power receiving circuit relative to a power transmitting circuit based on a position of the antenna circuit relative to the power receiving circuit and a position of the power transmitting circuit relative to the at least two sensor circuits.

18. The method of claim 11, further comprising determining alignment information for aligning a power receiving circuit with a power transmitting circuit based on a position of the power receiving circuit relative to the power transmitting circuit.

19. The method of claim 11, further comprising detecting an object other than the antenna circuit of the vehicle by the plurality of sensor circuits.

20. An apparatus for determining alignment information of a vehicle, the vehicle comprising an antenna circuit configured to modulate one or more electrical characteristics of the antenna circuit, the apparatus comprising:
means for generating a plurality of magnetic fields;
means for sensing the modulated electrical characteristic of the antenna circuit when the antenna circuit couples to the means for generating via one of the plurality of magnetic fields; and
means for determining alignment information of the vehicle based on the sensed modulated electrical characteristic.

21. The apparatus of claim 20, wherein the means for generating a plurality of magnetic fields comprises a plurality of coils and at least one driving circuit configured to drive the plurality of coils with a current.

22. The apparatus of claim 20, wherein the means for sensing the modulated electrical characteristic comprises a plurality of coils and at least one sensing circuit configured to sense the modulated electrical characteristic based on a disturbance in the magnetic field of the means for generating.

23. The apparatus of claim 20, wherein the means for determining alignment information comprises a controller circuit.

24. The apparatus of claim 20, wherein the means for sensing the modulated electrical characteristic senses a modulated or varied impedance of the antenna circuit.

25. The apparatus of claim 20, further comprising:
means for sensing a distinctive modulation pattern based on a distinct change of the disturbance in a magnetic field of the means for generating in response to a degree of coupling to the antenna circuit, wherein the electrical characteristic is modulated based on the distinct modulation pattern; and
means for uniquely identifying the antenna circuit based on the sensed distinct modulation pattern.

26. The apparatus of claim 20, further comprising means for determining a position of the antenna circuit relative the means for sensing based on a comparison of a magnitude of the sensed modulated electrical characteristic when the antenna circuit couples to the means for generating via at least two of the magnetic fields.

27. The apparatus of claim 20, wherein the means for sensing is further configured to detect an object other than the antenna circuit of the vehicle by the plurality of sensor circuits.

28. A non-transitory computer readable medium comprising instructions that, when executed by a processor, cause a wireless power transfer system to perform a method for determining alignment information of a vehicle, the vehicle comprising an antenna circuit configured to modulate one or more electrical characteristics of the antenna circuit, the method comprising:
generating, by a plurality of sensor circuits, a plurality of magnetic fields;
sensing, by at least one sensor circuit of the plurality of sensor circuits, the modulated electrical characteristic of the antenna circuit when the antenna circuit couples to the at least one sensor circuit via one of the plurality of magnetic fields; and
determining alignment information of the vehicle based on the sensed modulated electrical characteristic.

29. The medium of claim 28, wherein sensing the modulated electrical characteristic comprises sensing a modulated or varied impedance of the antenna circuit.

30. The medium of claim 28, further comprising:
sensing a distinctive modulation pattern based on a distinct change of the disturbance in a magnetic field of the at least one sensor circuit in response to a degree of coupling to the antenna circuit, wherein the modulated electrical characteristic is modulated based on the distinct modulation pattern; and
uniquely identifying the antenna circuit based on the sensed distinct modulation pattern.

* * * * *

UNITED STATES PATENT AND TRADEMARK OFFICE
CERTIFICATE OF CORRECTION

| | | |
|---|---|---|
| PATENT NO. | : 10,461,587 B2 | Page 1 of 1 |
| APPLICATION NO. | : 15/269749 | |
| DATED | : October 29, 2019 | |
| INVENTOR(S) | : Lukas Sieber | |

It is certified that error appears in the above-identified patent and that said Letters Patent is hereby corrected as shown below:

In the Specification

Column 14 at Line 46; After "100" insert --.--.

In the Claims

Column 28 at Line 41; In Claim 5, after "configured" insert --to--.

Column 30 at Line 43; In Claim 26, after "relative" insert --to--.

Signed and Sealed this
Fourteenth Day of April, 2020

Andrei Iancu
*Director of the United States Patent and Trademark Office*